(12) United States Patent
Hamel-Gagnon et al.

(10) Patent No.: US 12,179,569 B2
(45) Date of Patent: Dec. 31, 2024

(54) VEHICLE HAVING A PIVOTABLE ROOF

(71) Applicant: BOMBARDIER RECREATIONAL PRODUCTS INC., Valcourt (CA)

(72) Inventors: Mathieu Hamel-Gagnon, Sherbrooke (CA); Kevin St-Pierre, Acton Vale (CA); Jerome Lefrancois, Sherbrooke (CA); Hugo Martin, Knowlton (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 28 days.

(21) Appl. No.: 17/786,740

(22) PCT Filed: Dec. 18, 2020

(86) PCT No.: PCT/IB2020/062247
§ 371 (c)(1),
(2) Date: Jun. 17, 2022

(87) PCT Pub. No.: WO2021/124294
PCT Pub. Date: Jun. 24, 2021

(65) Prior Publication Data
US 2023/0013108 A1    Jan. 19, 2023

Related U.S. Application Data

(60) Provisional application No. 62/951,760, filed on Dec. 20, 2019.

(51) Int. Cl.
*B60J 7/16* (2006.01)
*B60G 7/02* (2006.01)
(Continued)

(52) U.S. Cl.
CPC .............. *B60J 7/1657* (2013.01); *B60G 7/02* (2013.01); *B60N 2/015* (2013.01);
(Continued)

(58) Field of Classification Search
CPC ..... B60J 7/1657; B60J 7/08; B60J 7/12; B60J 7/1621; B60J 7/1942; B60R 2021/137
See application file for complete search history.

(56) References Cited

U.S. PATENT DOCUMENTS 2,943,884 A   7/1960  Fritzmeier
3,336,074 A   8/1967  Barnes et al.
(Continued)

FOREIGN PATENT DOCUMENTS

EP    2786884 A2    10/2014

OTHER PUBLICATIONS

International Search Report of PCT/IB2020/062247; Blaine R. Copenheaver; May 19, 2021.
(Continued)

*Primary Examiner* — Paul N Dickson
*Assistant Examiner* — Tiffany L Webb

(57) ABSTRACT

A vehicle includes: a frame including a roll cage, a motor connected to the frame, a driver seat connected to the frame, and a roof extending at least in part above the driver seat. The roof includes an upper surface and a lower surface. At least part of the roof is pivotably connected to the roll cage about a roof pivot axis so that the at least part of the roof is pivotable from a closed position to an open position. In the closed position, the at least part of the roof covers a roof opening defined by the roll cage, and in the open position, the at least part of the roof at least partly exposes the roof opening.

23 Claims, 23 Drawing Sheets

(51) Int. Cl.
*B60N 2/015* (2006.01)
*B60R 11/02* (2006.01)
*B60R 21/13* (2006.01)
*B62D 7/06* (2006.01)

(52) U.S. Cl.
CPC .......... *B60R 11/0217* (2013.01); *B60R 21/13* (2013.01); *B62D 7/06* (2013.01); *B60R 2021/137* (2013.01)

(56) References Cited

U.S. PATENT DOCUMENTS

| | | | | |
|---|---|---|---|---|
| 4,415,197 A * | 11/1983 | Meyer | ................... | B60J 7/1642 296/216.02 |
| 5,470,126 A | 11/1995 | Hines, Jr. | | |
| 5,754,664 A * | 5/1998 | Clark | ....................... | H04R 5/02 381/86 |
| 6,149,228 A * | 11/2000 | O'Neill | .............. | B62D 33/0621 296/190.08 |
| 6,688,682 B2 * | 2/2004 | Arthur | ................... | B60J 7/1642 296/216.02 |
| 7,845,711 B2 * | 12/2010 | Orrell | .................... | B60J 1/1807 296/146.16 |
| 8,292,355 B2 * | 10/2012 | Miller | .................... | B60J 7/1621 296/210 |
| 9,365,094 B2 * | 6/2016 | Salamon | ................... | B60J 1/025 |
| 9,469,254 B1 * | 10/2016 | White | .................... | H04R 1/403 |
| 10,239,396 B2 * | 3/2019 | Huang | ................... | B60J 1/1884 |
| 10,604,194 B2 | 3/2020 | Mar | | |
| 10,889,165 B2 * | 1/2021 | Osorio | .................... | B60J 5/048 |
| 11,052,832 B2 * | 7/2021 | Mohr | .................... | B62D 33/06 |
| 11,148,733 B2 * | 10/2021 | Mar | ............................ | B60J 7/11 |
| 2002/0175534 A1 * | 11/2002 | Strong | ................... | B62D 53/02 296/77.1 |
| 2013/0199097 A1 * | 8/2013 | Spindler | ................. | B60R 21/06 49/394 |
| 2018/0072144 A1 | 3/2018 | Huang | | |
| 2021/0016645 A1 * | 1/2021 | Hirneise | ................ | B60J 7/1642 |

OTHER PUBLICATIONS

Can-Am Off Road, Your Music, Your Way: Turn It Up with the Can-Am Audio Roof., YouTube, retrieved from https://www.youtube.com/watch?v=U_AUgSBhzXE on Jun. 17, 2022.

* cited by examiner

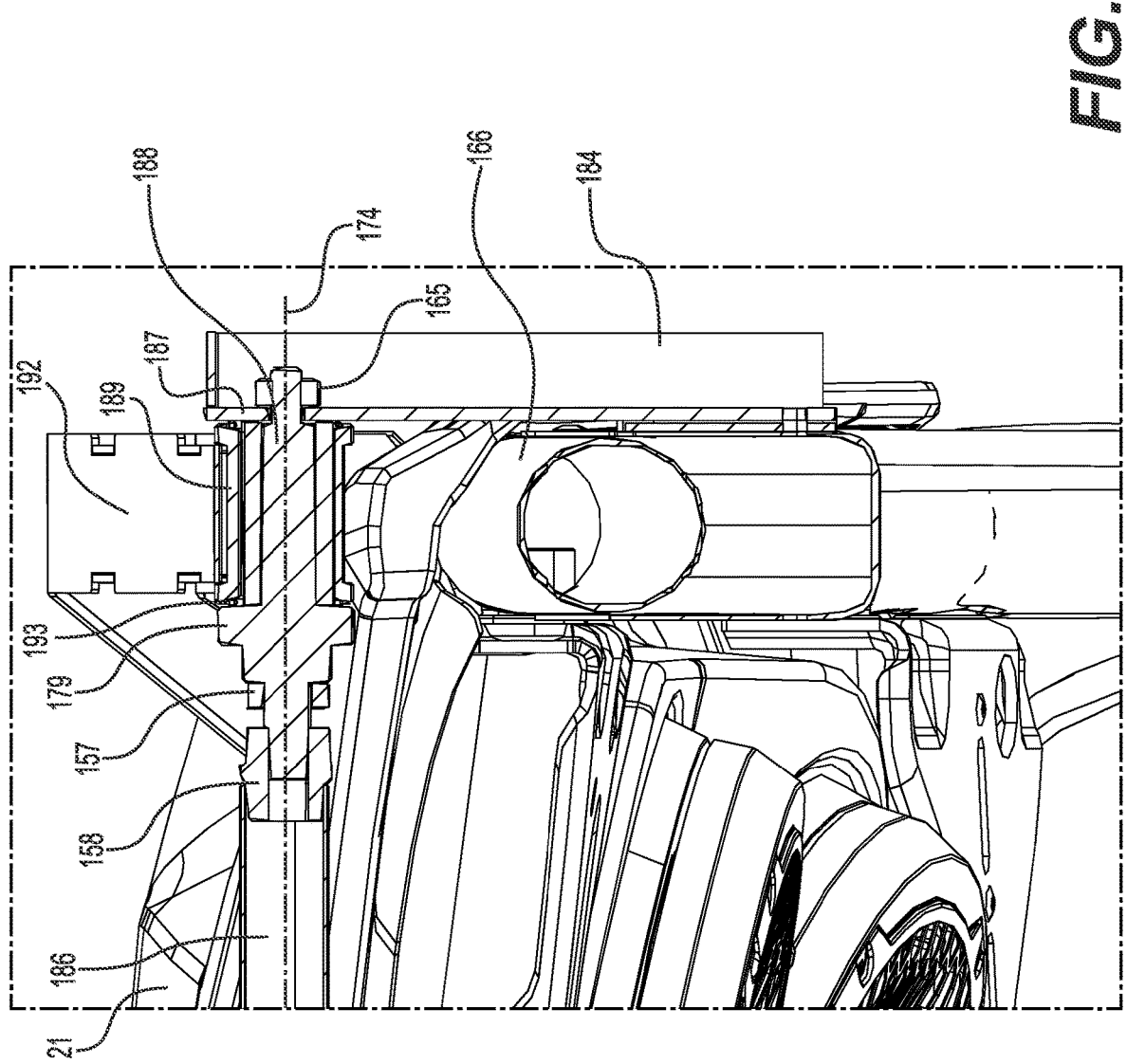

VEHICLE HAVING A PIVOTABLE ROOF

CROSS-REFERENCE

The present application claims priority from U.S. Provisional Patent Application No. 62/951,760, filed on Dec. 20, 2019, the entirety of which is incorporated herein by reference.

FIELD OF TECHNOLOGY

The present technology relates to roof assemblies for vehicles.

BACKGROUND

There exist various types of vehicles used mainly in off-road conditions. One such type is the side-by-side off-road vehicle (SSV). The name "side-by-side" refers to the seating arrangement in a cockpit of the vehicle in which the driver and a passenger are seated side-by-side. In some embodiments, the cockpit is defined in part by a roof extending over the driver and passenger seats and a roll cage surrounding the driver and passenger seats.

An SSV is sometimes equipped with an audio system for transmitting sound within the cabin of the vehicle for the enjoyment of the occupants of the vehicle. In some cases, the speakers of the audio system are installed on the roof of the vehicle to project sound downwards towards the vehicle occupants. However, sound emitted by the audio system outside of the vehicle is generally limited and is typically achieved by turning up the volume of the audio system inside the vehicle so that it can be heard more clearly from outside, although this often degrades sound quality.

As such, there is a desire for a vehicle that addresses at least in part some of these drawbacks.

SUMMARY

It is an object of the present technology to ameliorate at least some of the inconveniences present in the prior art.

According to one aspect of the present technology, there is provided a vehicle including: a frame including a roll cage; a motor connected to the frame; a driver seat connected to the frame, the roll cage at least partly surrounding the driver seat; at least one front suspension assembly connected to the frame; at least one rear suspension assembly connected to the frame; at least one front ground-engaging member operatively connected to the at least one front suspension assembly; at least one rear ground-engaging member operatively connected to the at least one rear suspension assembly, at least one of the at least one front ground-engaging member and the at least one rear ground-engaging member being operatively connected to the motor; a steering system for steering one or both of the at least one front ground-engaging member and the at least one rear ground-engaging member; and a roof extending at least in part above the driver seat and having an upper surface and a lower surface. At least part of the roof is pivotably connected to the roll cage about a roof pivot axis so that the at least part of the roof is pivotable from a closed position to an open position. In the closed position, the at least part of the roof covers a roof opening defined by the roll cage. In the open position, the at least part of the roof at least partly exposes the roof opening.

In some embodiments, the roof pivot axis extends laterally.

In some embodiments, the roof pivot axis is disposed vertically higher than a front end of the roof when the vehicle is on a flat horizontal surface and the at least part of the roof is in the closed position.

In some embodiments, the roof pivot axis is disposed forwardly of the roof in the closed position of the at least part of the roof.

In some embodiments, the vehicle also includes at least one upwardly-extending member connected to the roll cage, and at least one roof connecting arm connected between the roof and the upwardly-extending member. The at least one roof connecting arm is pivotably connected to the at least one upwardly-extending member about the roof pivot axis.

In some embodiments, the at least one upwardly-extending member has a lower end and an upper end; the at least one roof connecting arm has a front end and a rear end; the lower end of the at least one upwardly-extending member is connected to the roll cage; the upper end of the at least one upwardly-extending member is pivotably connected to the front end of the at least one roof connecting arm, the roof pivot axis being defined at the upper end of the at least one upwardly-extending member; and the rear end of the at least one roof connecting arm is connected to the roof.

In some embodiments, the at least one upwardly-extending member includes a first upwardly extending member and a second upwardly extending member, the first upwardly extending member and the second upwardly extending member being laterally-spaced from one another; and the at least one roof connecting arm includes a first roof connecting arm and a second roof connecting arm, the first roof connecting arm and the second roof connecting arm being laterally-spaced from one another.

In some embodiments, the vehicle also includes a transverse member interconnecting the first upwardly-extending member and the first roof connecting arm to the second upwardly-extending member and the second roof connecting arm, the transverse member extending along the roof pivot axis.

In some embodiments, the roof is made of plastic material.

In some embodiments, the roof is hollow; the roof has a body portion and a peripheral portion surrounding the body portion; the roof has an upper wall and a lower wall which form the body and peripheral portions, the upper wall defining the upper surface of the roof, the lower wall defining the lower surface of the roof and the upper and lower walls define at least one hollow space therebetween.

In some embodiments, the roof is a blow molded component.

In some embodiments, the upper and lower walls are joined at the peripheral portion such that a thickness of at least part of the peripheral portion is greater than a thickness of either of the upper wall and the lower wall individually.

In some embodiments, the thickness of the at least part of the peripheral portion is approximately double the thickness of either of the upper wall and the lower wall individually.

In some embodiments, the peripheral portion includes two lateral end portions, a front end portion, and a rear end portion; and the lateral end portions are curved downwardly to define respective concave spaces that receive part of the frame therein in the closed position of the at least part of the roof.

In some embodiments, the body portion defines at least one pinched section whereby the upper wall and the lower wall of the roof are joined together such that a thickness of the at least one pinched section is greater than a thickness of either of the upper wall and the lower wall individually.

In some embodiments, the lower wall extends upwardly toward the upper wall near the at least one pinched section to define at least one depression; the at least one depression extends generally longitudinally and is sized and shaped to receive at least part of the roll cage therein when the at least part of the roof is in the closed position; and the at least one pinched section is located at a position of the least one depression of the lower wall.

In some embodiments, the vehicle also includes: at least one upwardly-extending member connected to the roll cage; and at least one roof connecting arm connected between the roof and the upwardly-extending member, the at least one roof connecting arm being pivotably connected to the at least one upwardly-extending member about the roof pivot axis, the at least one roof connecting arm being connected to the roof near the at least one pinched section.

In some embodiments, the vehicle also includes an audio system including at least one speaker connected to the lower wall of the roof.

In some embodiments, the roof also includes inserts molded integrally with the roof for connecting the audio system to the roof.

In some embodiments, the lower wall of the roof defines at least one wire recess for enclosing at least one wire of the audio system.

In some embodiments, the lower wall extends upwardly toward the upper wall near the at least one pinched section to define at least one depression; the at least one depression extends generally longitudinally and is sized and shaped to receive at least part of the roll cage therein when the at least part of the roof is in the closed position; and the at least one wire recess extends at least partly along the at least one depression.

In some embodiments, the audio system also includes an amplifier connected to the lower wall of the roof.

In some embodiments, the audio system also includes a control panel in communication with the amplifier and the at least one speaker, the control panel being connected to the lower wall of the roof.

In some embodiments, the at least one speaker includes a first speaker and a second speaker; and the control panel is positioned laterally between the first and second speakers.

In some embodiments, the control panel is accessible to a driver sitting in the driver seat in both the closed and open positions of the at least part of the roof.

In some embodiments, a majority of the at least one speaker is disposed between the lower and upper walls of the roof.

In some embodiments, the at least part of the roof pivots forwardly from the closed position to the open position so that the at least one speaker at least partly faces rearwardly in the open position of the at least part of the roof.

In some embodiments, each lateral end portion of the two lateral end portions defines a groove extending generally longitudinally and configured to be cut along thereof for removing part of the respective lateral end portion.

In some embodiments, the roof also includes at least one attachment for securing the roof to the roll cage in the closed position of the roof, the at least one attachment being disposed on the lower surface of the roof.

In some embodiments, each of the at least one attachment comprises a flexible clamp that wraps around a corresponding part of the roll cage to secure the roof to the roll cage in the closed position of the at least part of the roof.

In some embodiments, the lower surface of the roof comprises at least one aperture for draining water from within the at least one hollow space defined by the roof.

In some embodiments, the vehicle also includes a roof support member for supporting the at least part of the roof in the open position, the roof support member being connected between the roll cage and the roof. In the open position, the roof support member extends upwardly from the roll cage to support the at least part of the roof.

In some embodiments, the roof support member is one of pneumatically and hydraulically supported.

In some embodiments, the vehicle is a side-by-side vehicle (SSV).

For purposes of this application, terms related to spatial orientation such as forwardly, rearward, upwardly, downwardly, left, right, inner and outer are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 9B is a close-up of part of the cross-sectional view of FIG. 9A;

DETAILED DESCRIPTION

The present technology will be described with respect to a side-by-side vehicle (SSV) 10 having four wheels and two side-by-side seats. However, it is contemplated that the present technology may apply to other vehicles such as, but not limited to, off-road vehicles having a handlebar and a straddle seat (e.g., an all-terrain vehicle (ATV)), off-road vehicles having more or less than four wheels, as well as vehicles having ground-engaging members other than wheels.

Figure 4:
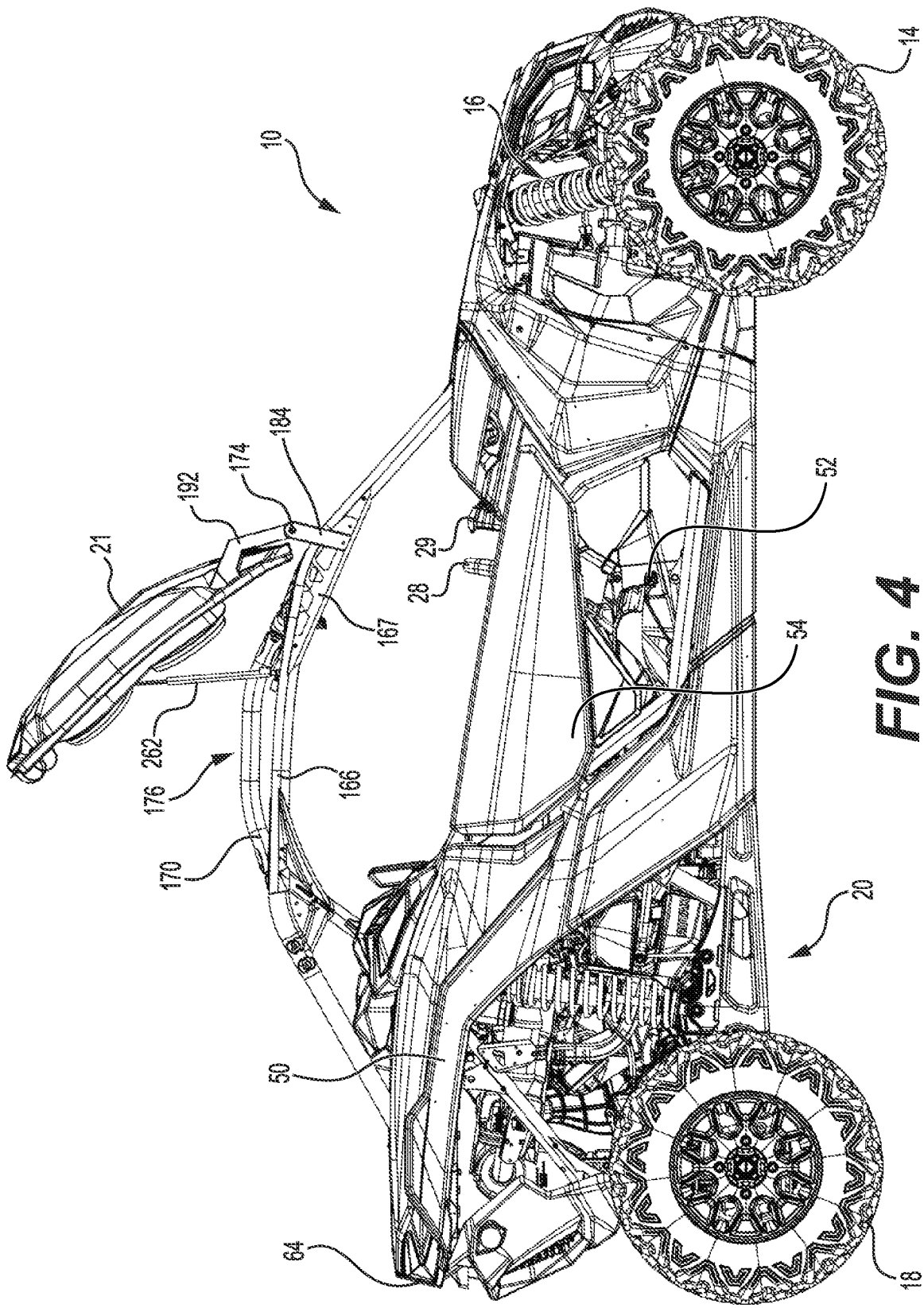
FIG. 4 is a right side elevation view of the vehicle of FIG. 1, with a roof thereof in an open position.
Figure 5:
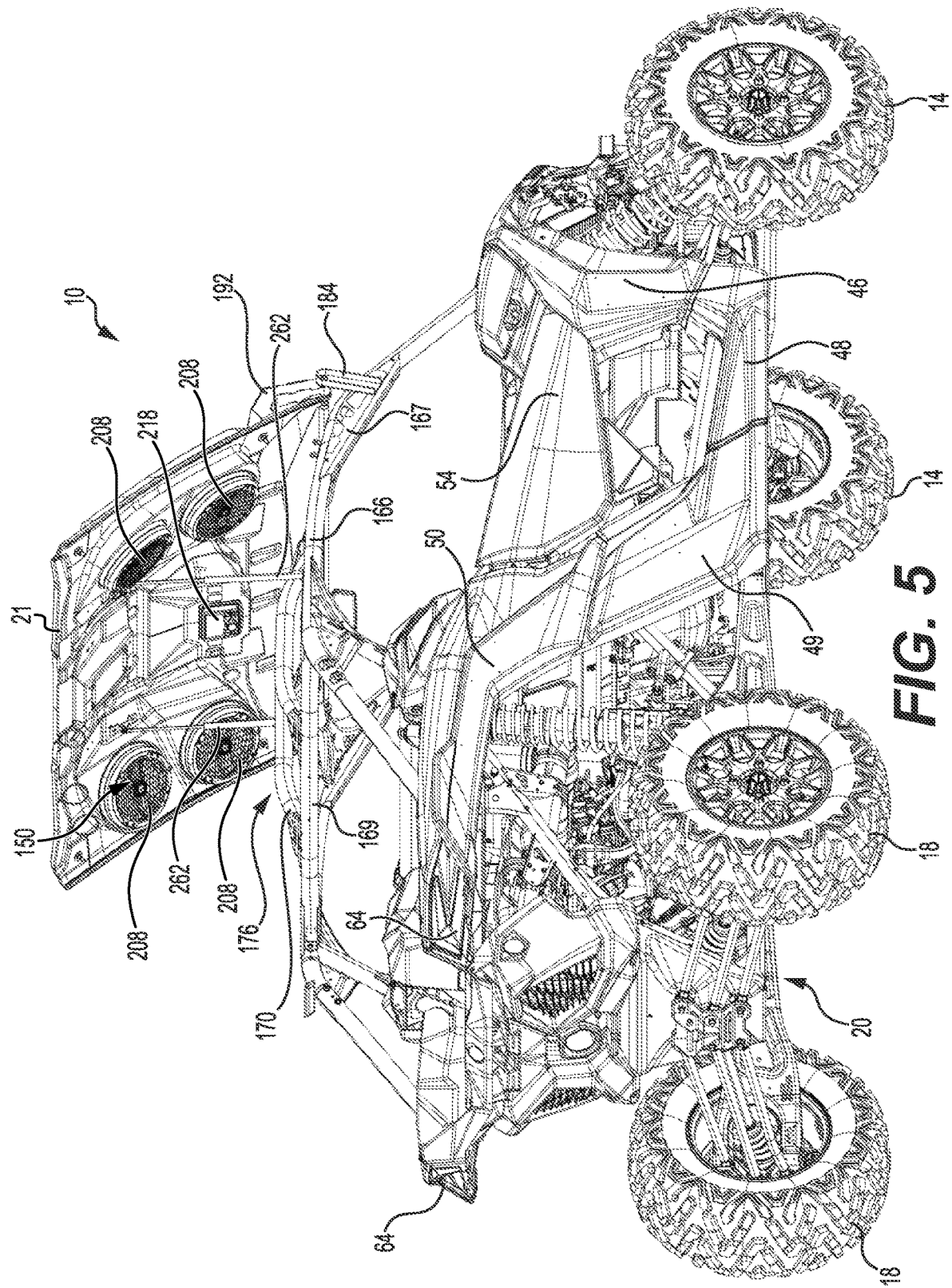
FIG. 5 is a perspective view, taken from a rear, right side, of the vehicle of FIG. 1, with the roof in the open position.

The general features of the vehicle 10 will be described with respect to FIGS. 1 to 5. The vehicle 10 has a frame 12, two front wheels 14 connected to a front portion of the frame 12 by front suspension assemblies 16 and two rear wheels 18 connected to a rear portion of the frame 12 by rear suspension assemblies 20. As will be described in greater detail below, the vehicle 10 has a pivotable roof 21 housing an audio system 150 (FIG. 5).

The frame 12 defines a central cockpit area 22 inside which are disposed a driver seat 24 and a passenger seat 26 arranged side-by-side in a row. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. Moreover, it is contemplated that the vehicle 10 could have additional seats. For instance, the vehicle 10 could have an additional row of seats arranged side-by-side behind the driver and passenger seats 24, 26. A user-operated steering system device 28 is disposed in front of the driver seat 24. In this implementation, the user-operated steering system device 28 is a steering wheel. The steering wheel 28 is used to turn the front wheels 14 to steer the vehicle 10. However, it is contemplated that the steering wheel 28 can also be used to turn the rear wheels 18 or both the front and rear wheels 14, 18. Various displays and gauges 29 (FIG. 6) are disposed above the steering wheel 28 to provide information to the driver regarding the operating conditions of the vehicle 10. Examples of displays and gauges 29 include, but are not limited to, a speedometer, a tachometer, a fuel gauge, a transmission position display, and an oil temperature gauge.

Figure 6:
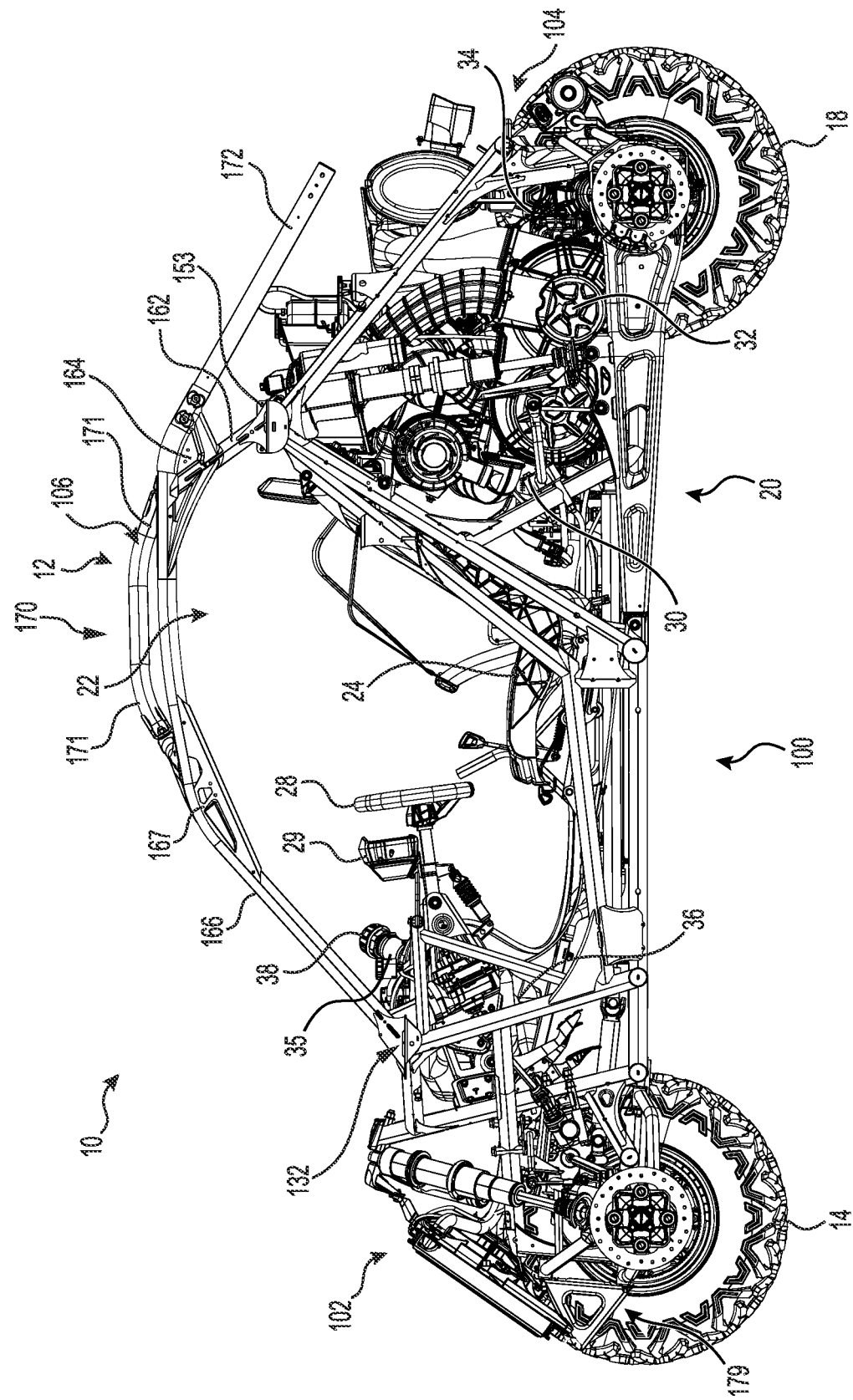
FIG. 6 is a left side elevation view of the vehicle of FIG. 1, with body panels, left wheels and the roof thereof removed to expose a frame of the vehicle.

As can be seen in FIG. 6, a motor 30 is connected to the frame 12 in a rear portion of the vehicle 10. In this embodiment, the motor 30 is an internal combustion engine. However, it is contemplated that the motor 30 could be an electric motor, a hybrid or another type of suitable motor in other embodiments. The motor 30 is connected to a continuously variable transmission (CVT) 32 disposed on a left side of the motor 30. The CVT 32 is operatively connected to a transaxle 34 to transmit torque from the motor 30 to the transaxle 34. The transaxle 34 is disposed behind the motor 30. The transaxle 34 is operatively connected to the front and rear wheels 14, 18 to propel the vehicle 10. A fuel tank 36 is suspended from the frame 12 in front of the driver seat 26. The fuel tank 36 is disposed above the floor of the cockpit area 22 to the right of a longitudinal centerline of the vehicle 10. A filler neck 35 that is selectively closed by a cap 38 extends upward, rightward and rearward from a top, right and rear portion of the fuel tank 36. A fuel pump (not shown) is inserted through a top of the fuel tank 36.

Figure 1:
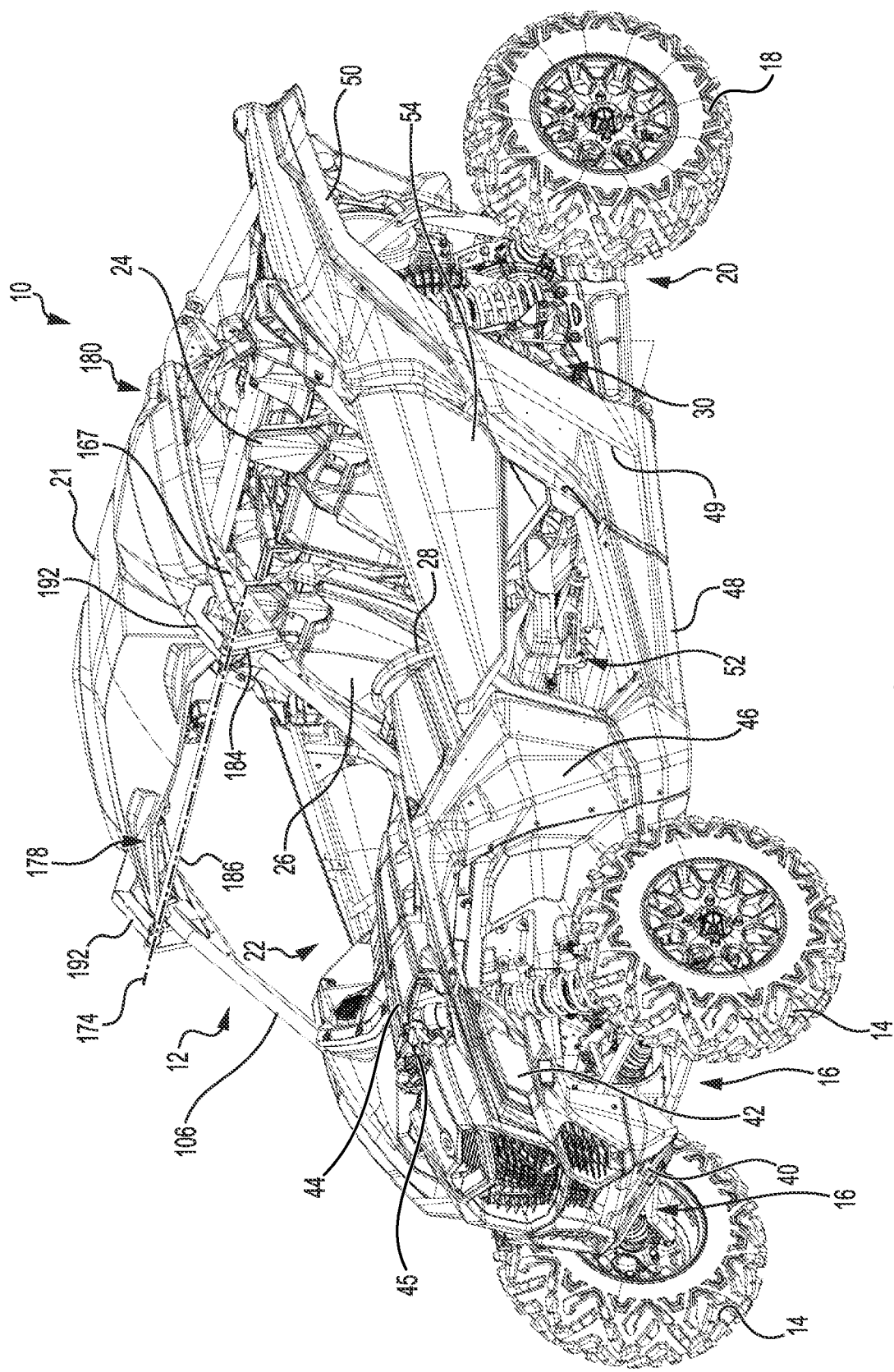
FIG. 1 is a perspective view, taken from front, left side, of an off-road vehicle in accordance with an embodiment of the present technology.
Figure 2:
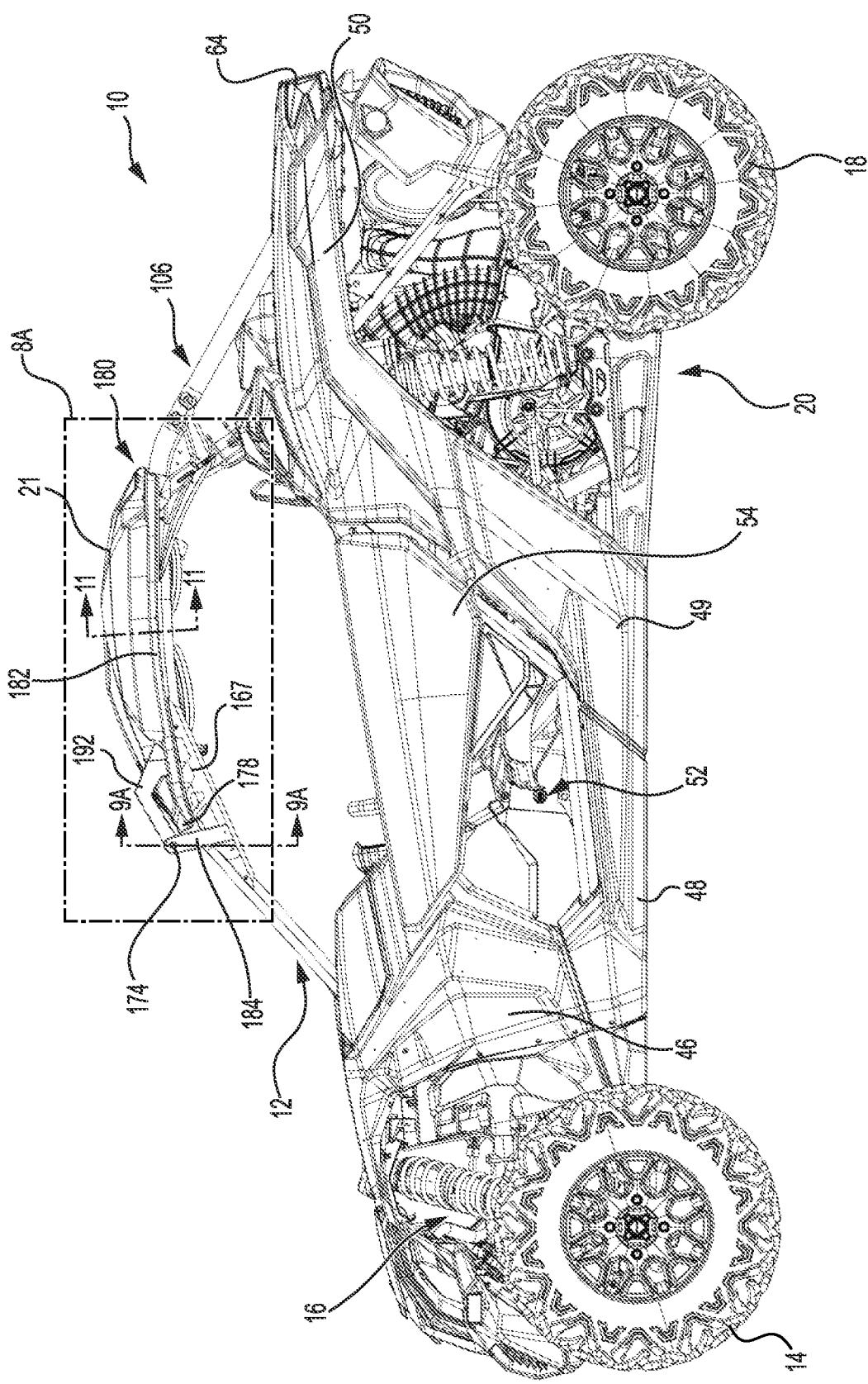
FIG. 2 is a left side elevation view of the vehicle of FIG. 1.
Figure 3:
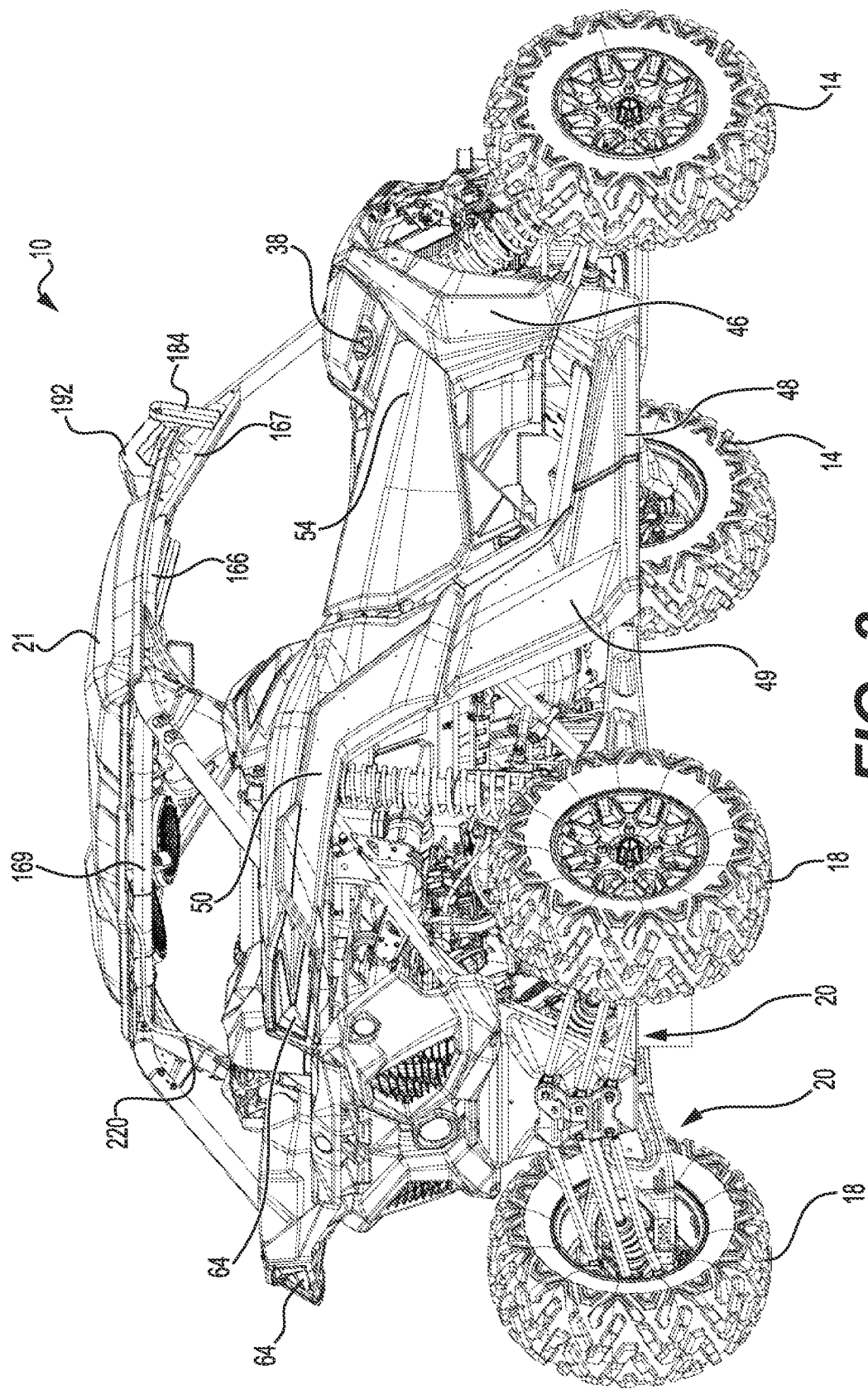
FIG. 3 is a perspective view, taken from a rear, right side, of the vehicle of FIG. 1.

Turning back to FIGS. 1 to 5, various body panels are connected to the frame 12. The panels help protect the internal components of the vehicle 10 and provide some of the aesthetic features of the vehicle 10. Front panels 40 are connected to a front of the frame 12. The front panels 40 are disposed forward of the front suspension assemblies 16 and laterally between the front wheels 14. The front panels 40 define two apertures inside which the headlights 42 of the vehicle 10 are disposed. A cover 44 extends generally horizontally reward from a top of the front panels 40. The cover 44 defines an aperture 45 through which tops of the front suspension assemblies 16 protrude. Front fenders 46 are disposed rearward of the front panels 40 on each side of the vehicle 10. Each front fender 46 is disposed in part above and in part behind of its corresponding front wheel 14. Lower panels 48 extend along the bottom of the frame 12 between the front and rear wheels 14, 18. As can be seen in FIG. 2 for the left lower panel 48, each lower panel 48 has a front end disposed under the bottom portion of its corresponding front fender 46 and extends rearward therefrom. A generally L-shaped panel 49 is disposed behind the rear end of each lower panel 48. Generally L-shaped rear fenders 50 extend upward and then rearward from the rear, upper ends of the L-shaped panels 49. Each rear fender 50 is disposed in part above and in part forward of its corresponding rear wheel 18. The rear fenders 50 define apertures at the rear thereof to receive the brake lights 64 of the vehicle 10. It is contemplated that the brake lights 64 could be replaced with reflectors or that reflectors could be provided in addition to the brake lights 64.

On each side of the vehicle 10, the front fender 46, the lower panel 48, the L-shaped panel 49, the rear fender 50, and the frame 12 define a passage 52 through which a driver (or passenger depending on the side of the vehicle 10) can enter or exit the vehicle 10. Each side of the vehicle 10 is provided with a door 54 that selectively closes a middle portion of the corresponding passage 52. Each door 54 is hinged at a rear thereof to its corresponding rear fender 50 and associated portion of the frame 12 and is selectively connected at a front thereof to its corresponding front fender 46 via a releasable latch (not shown). It is contemplated that each door 54 could be hinged at a front thereof and latched at a rear thereof.

Figure 7:
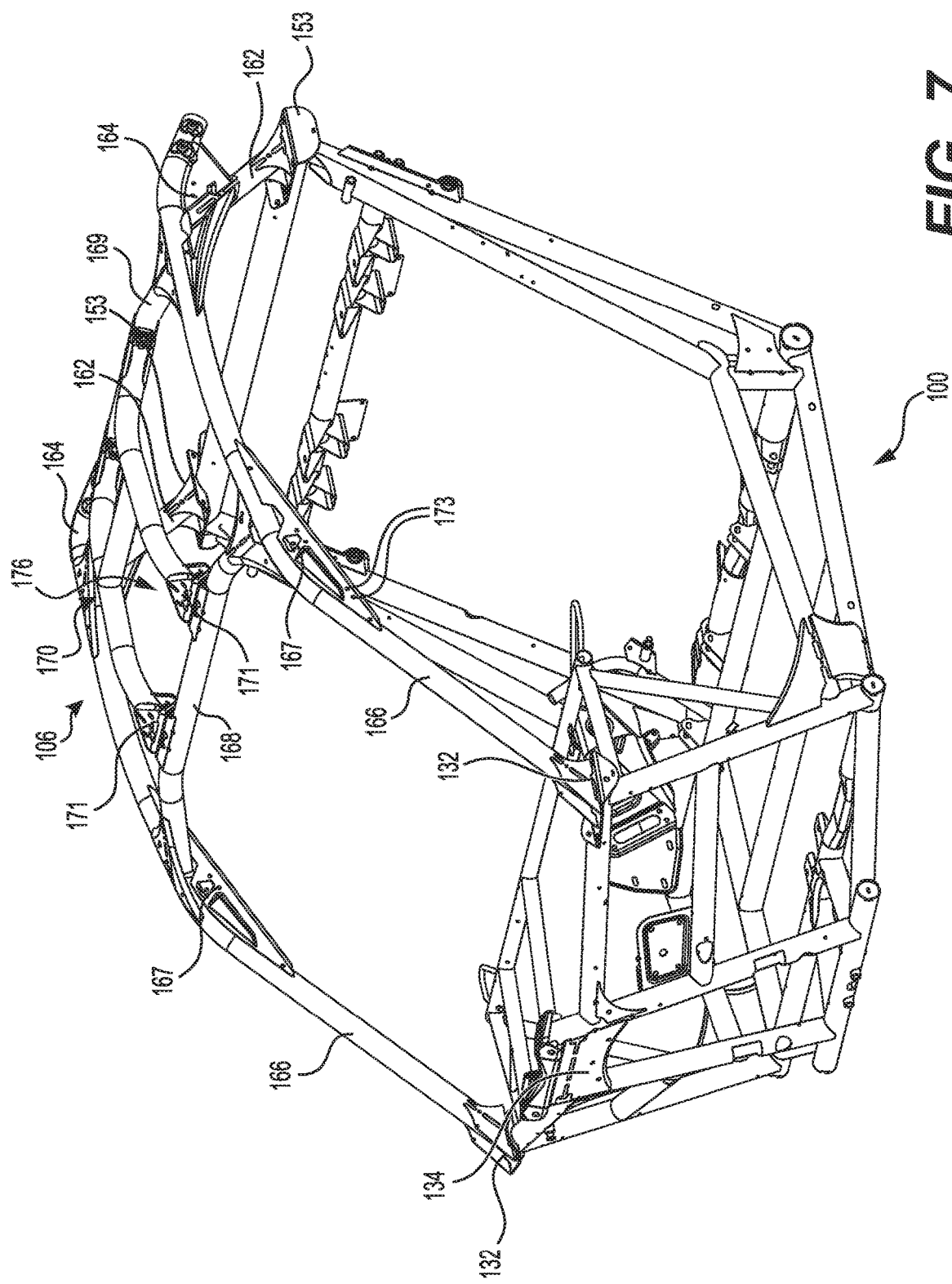
FIG. 7 is a perspective view, taken from a front, left side, of a central portion of the frame of FIG. 6.

Turning now to FIGS. 6 and 7, the frame 12 of the vehicle 10 will be described in more detail. The frame 12 has a central portion 100, a front portion 102 and a rear portion 104. As their names suggest, the front portion 102 is disposed in front of the central portion 100 and the rear portion 104 is disposed behind the central portion 100. The central portion 100 defines the cockpit area 22 in which the seats 24, 26 are disposed. The central portion 100 also defines a roll cage 106 at least partly surrounding the driver seat 24. The front suspension assemblies 16 are connected to the central and front portions 100, 102 of the frame 12. The motor 30, the CVT 32 and the transaxle 34 are supported by the rear portion 104 of the frame 12. The rear suspension assemblies 20 are connected to the central and rear portions 100, 104 of the frame 12. The frame 12 is made from a plurality of hollow cylindrical steel members and steel brackets that are welded to each other. It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example.

The roll cage 106 will now be described in detail with reference to FIGS. 6 and 7. The roll cage 106 is respectively connected, namely welded, at its front and rear to front brackets 132, and rear brackets 153 of the central portion 100 of the frame 12. The roll cage 106 has two legs 162 connected to and extending upwardly and forwardly from the corresponding rear brackets 153. The upper ends of the legs 162 are received in and connected to respective connectors 164. Two legs 166 are connected to and extend upward and rearward from the front brackets 132. It is contemplated that the legs 166, 162 may bolted to the brackets 132, 153 in other embodiments. The upper ends of the legs 166 are received in and connected to the connectors 164. As best seen in FIG. 7, the legs 166 are bent near their center points and are thus curved downwardly. Two brackets 167 are provided at the bend in the legs 166 and define a plurality of apertures 173 to pivotably connect the roof 21 to the roll cage 106, as will be described below. A front cross-member 168 is connected to and extends between the legs 166. The cross-member 168 is connected to the legs 166 at points disposed slightly rearward of the bends in the legs 166. The cross-member 168 has two angled portions and a lateral portion disposed between the angled portions. The angled portions of the cross-member 168 extend upward, rearward and laterally inward from the legs 166.

Figure 12:
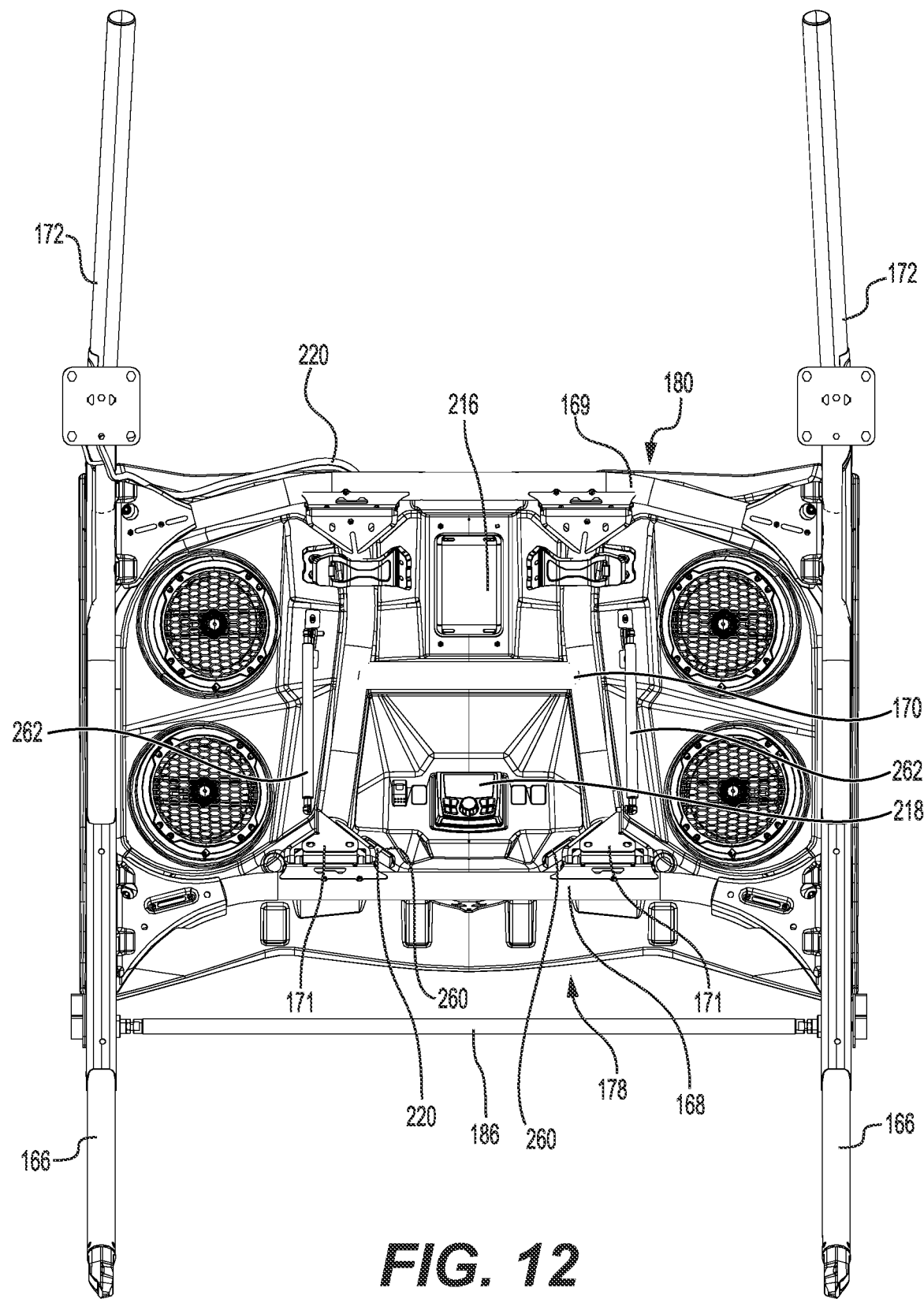
FIG. 12 is a bottom plan view of the roof and a roll cage of the frame of the vehicle of FIG. 1 with the roof in the closed position.

A rear cross-member 169 is connected to and extends between the legs 166. The cross-member 169 is disposed rearward of the cross-member 168. The cross-member 169 is connected to the legs 166 at points disposed forward of the upper ends of the legs 162. The cross-member 169 has two angled portions and a lateral portion disposed between the angled portions. The angled portions of the cross-member 169 extend rearward and laterally inward from the legs 166. As best seen in FIG. 12, the lateral portion of the cross-member 168 is longer than the lateral portion of the cross-member 169. A generally H-shaped frame structure 170 is connected by brackets 171 between the cross-members 168, 169. The H-shaped frame structure 170 extends over the central portion of the cockpit area 22. As can be seen in FIG. 6, the H-shaped frame structure 170 is curved downwardly and is vertically higher than the top of the legs 166. In particular, the H-shaped frame structure 170 includes left and right longitudinally-extending members 175 and a laterally-extending member 177 extending therebetween. Legs 172 connect to the connectors 164 and extend rearward, downward and laterally inward therefrom through the rear fenders 50. Brackets (not shown) connect the rear of the legs 172 to the rear portion 104 of the frame 12. Notably, in this embodiment, the legs 172 are welded to the brackets of the rear portion 104 of the frame 12. It is contemplated that the legs 172 could be bolted to the brackets of the rear portion of the frame 12 in other embodiments.

Turning back to FIGS. 1 to 5, the roof 21 extends above the seats 24, 26 such as to cover a central portion of the cockpit area 22. In this embodiment, the roof 21 pivots, in its entirety, about a roof pivot axis 174 such that the roof 21 can be pivoted from a closed position, illustrated in FIGS. 1 to 3, to an open position, illustrated in FIGS. 4 and 5. As Notably, the roof 21 can be opened (i.e., placed in the open position) when a user desires for sound emitted by the audio system 150 housed thereby to be projected at least partly exteriorly of the vehicle 10 rather than being projected into the cabin of the vehicle 10 (i.e., towards the seats 24, 26). In particular, this can be helpful for improving the quality of the sound heard from outside of the vehicle 10 which may be desirable in certain situations (e.g., listening to music from outside of the vehicle 10 when the vehicle 10 is parked).

As will be described further below, in some embodiments, only a portion (rather than the entirety) of the roof 21 may be pivotable between the open and closed positions.

In the closed position, the roof 21 covers a roof opening 176 (FIG. 4) defined by the roll cage 106, notably between the legs 166 and the H-shaped frame structure 170 of the roll cage 106. Moreover, in the closed position, the roof 21 receives the legs 166, the cross-members 168, 169, as well as the generally H-shaped frame structure 170 of the roll cage 106, as will be discussed in greater detail below. Conversely, as can be seen in FIG. 5, in the open position, the roof 21 exposes the roof opening 176 and is generally distanced from the roll cage 106. Notably, in the open position, the roof 21 is vertically higher than in the closed position.

The roof pivot axis 174 extends laterally such that, when the roof 21 pivots about the roof pivot axis 174, the roof 174 pivots either forwardly or backwardly about the roof pivot axis 174. As can be seen in FIGS. 2 and 4, the roof pivot axis 174 is disposed forwardly of a front end 178 of the roof 21, both in the closed and open positions of the roof 21. Moreover, when the vehicle 10 is on a flat horizontal surface and the roof 21 is in the closed position, the roof pivot axis 174 is disposed vertically higher than the front end 178 of the roof 21. By having the roof pivot axis 174 disposed forwardly of the roof 21, the roof 21 is pivoted forwardly from the closed position to the open position. This can be helpful to prevent accidental opening of the roof 21 (i.e., the roof 21 moving from the closed to the open position) when the roof 21 is improperly secured to the roll cage 106 (as will be discussed in more detail below) while the vehicle 10 is travelling forwardly and is thus subject to air resistance. Moreover, the position of the roof pivot axis 174 forwardly and vertically higher than the front end 178 of the roof 21 in the closed position of the roof 21 clears the front end 178 of the roof 21 from contacting the roll cage 106 through the range of motion of the roof 21. Nevertheless, it is contemplated that the roof pivot axis 174 could be disposed rearwardly of a rear end 180 of the roof 21 in other embodiments. In some embodiments, the roof pivot axis 174 may even extend generally longitudinally and to an outer lateral side of the lateral end 182 of the roof 21.

Figure 8A:
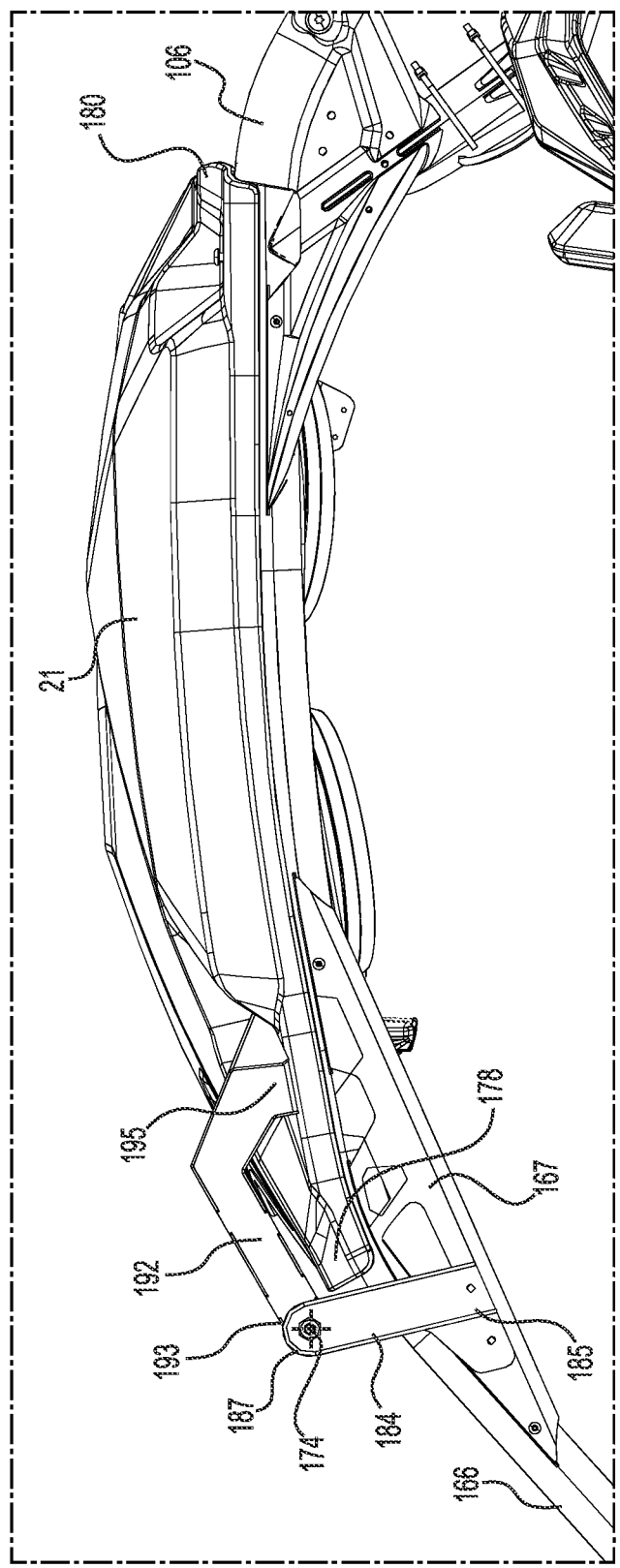
FIG. 8A is a left side elevation view of part of the vehicle of FIG. 1, showing in part a pivotable connection of the roof to the frame.

With reference to FIG. 8A, left and right upwardly-extending members 184 and left and right roof connecting arms 192 pivotably interconnect the roof 21 and the roll cage 106. As both of the upwardly-extending members 184 and both of the roof connecting arms 192 are mirror images of one another about a longitudinal centerplane of the vehicle 10, only the left upwardly-extending member 184 and the left roof connecting arm 192 and their connection will be described in detail below. It is understood that the same description applies to the right upwardly-extending member 184 and the right roof connecting arm 192 with respect to the right side of the vehicle 10.

Figure 9A:
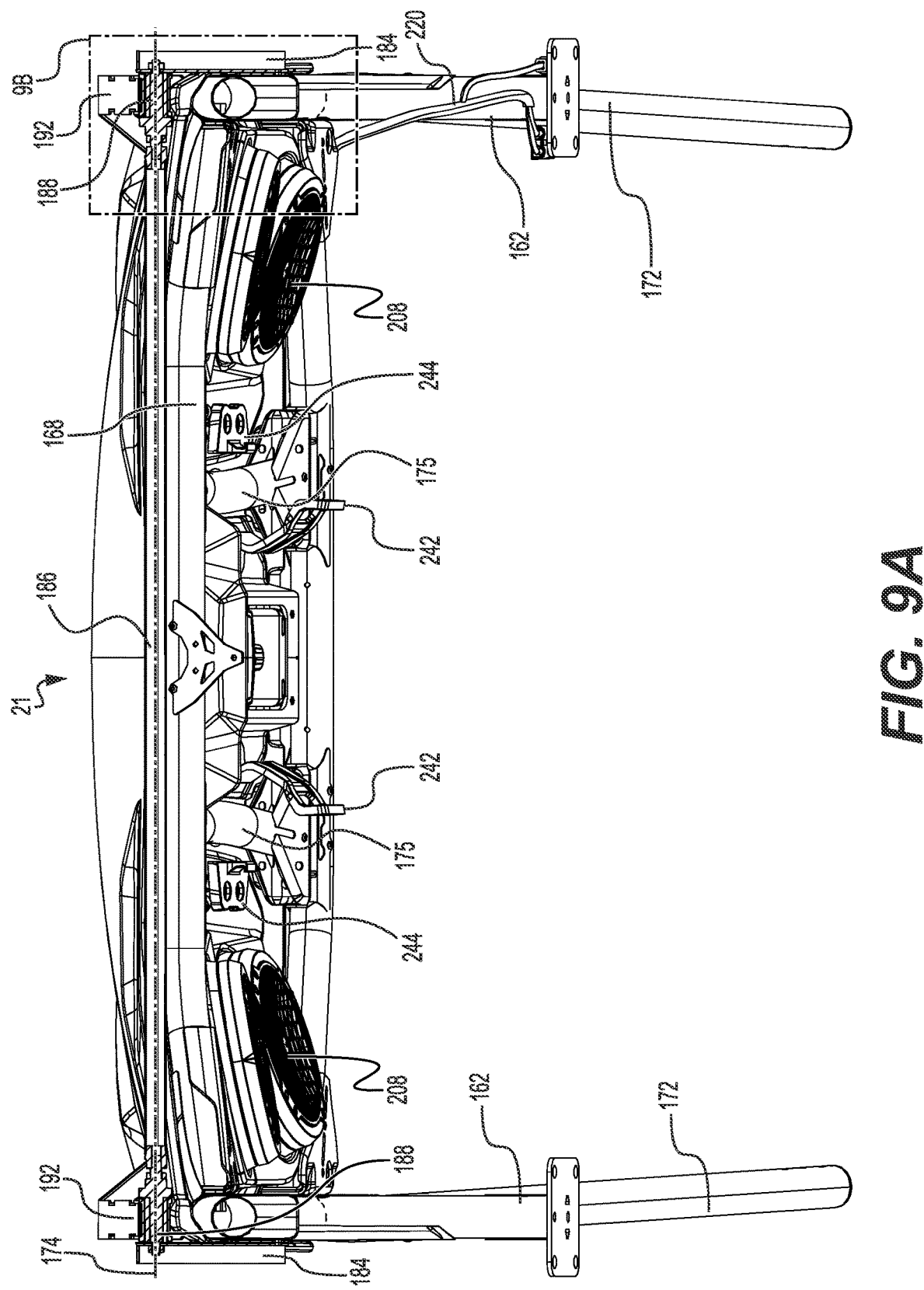
FIG. 9A is a cross-sectional view of the vehicle of FIG. 1 taken along line 9A-9A in FIG. 2.

The left upwardly-extending member 184 has a lower end 185 connected to the roll cage 106 and an upper end 187 pivotably connected to the left roof connecting arm 192. In particular, the lower end 185 is connected to a lower portion of a corresponding one of the brackets 167 of the roll cage 106 via the apertures 173 thereof. As shown in FIG. 9B, the upper end 187 of the upwardly-extending member 184 defines an opening which receives a left pin 188 that connects the upwardly-extending member 184 to the roof connecting arm 192. A fastener 165 (e.g., a nut) securely engages a left end of the pin 188 so to connect the pin 188 to the upwardly-extending member 184. As can be seen in FIG. 8A, the upwardly-extending member 184 extends upwardly and forwardly on the left side of the vehicle 10 from the lower end 185 to the upper end 187. Moreover, as best seen in FIG. 9A, the upwardly-extending member 184 is disposed laterally outwardly of the left leg 166.

The roof connecting arm 192 has a front end 193 pivotably connected to the upper end 187 of the corresponding upwardly-extending member 184 and a rear end 195 connected to the roof 21. More specifically, as shown in FIG. 9B, the front end 193 of the roof connecting arm 192 defines an opening which receives a bushing 189 therein which in turn receives the left pin 188 that interconnects the roof connecting arm 192 to the upwardly-extending member 184. As such, the roof connecting arm 192 is pivotable about the bushing 189. The pin 188 has a shoulder 179 which abuts the bushing 189 so that the bushing 189 is disposed between the shoulder 179 and the upper end 187 of the upwardly-extending member 184. Another fastener 157 (e.g., a nut) securely engages a right end of the pin 188.

In this embodiment, the roof connecting arm 192 is generally L-shaped. Notably, in the closed position of the roof 21, as shown in FIG. 8A, a first straight portion of the roof connecting arm 192 extends rearwards and upwards from the front end 193, and a second straight portion of the roof connecting arm 192 extends rearwards and downwards from the upper end of the first straight portion to the roof 21. It is contemplated that the roof connecting arm 192 could have other shapes in other embodiments (e.g., a J-shape, a C-shape).

As shown in FIG. 9A, in this embodiment, a transverse member 186 extends between the front ends 193 of the roof connecting arms 192 as well as between the upper ends 187 of the upwardly-extending members 184. The transverse member 186 thus extends along the roof pivot axis 174 which is defined at the upper ends 187 of the upwardly-extending members 184 and the front ends 193 of the roof connecting arms 192. Notably, the transverse member 186 connects the left coupled pair of the left upwardly-extending member 184 and the left roof connecting arm 192 to the right coupled pair of the right upwardly-extending member 184 and the right roof connecting arm 192. In particular, the transverse member 186 is connected to the left and right pins 188 at its left and right ends via couplings 158 (FIG. 9B).

The transverse member 186 provides rigidity and stability to the upwardly-extending members 184 and the roof connecting arms 192.

In this embodiment, the transverse member 186 is fixed and does not rotate together with the roof connecting arms 192. However, it is contemplated that, in other embodiments, the transverse member 186 could extend through the roof connecting arms 192 and thus rotate therewith about the roof pivot axis 174 when the roof 21 pivots from the closed position to the open position and vice-versa.

It is contemplated that the pivoting connection between the roof 21 and the roll cage 106 could be configured differently in other embodiments. For instance, in other embodiments, more than two upwardly-extending members 184 and roof connecting arms 192 may be provided to pivotably connect the roof 21 to the roll cage 106. In other embodiments, a single upwardly extending member 184 could be connected to the roll cage 106 and a single roof connecting arm 192 could be used to pivotably connect the roof 21 to the upwardly-extending member 184. In such embodiments, the transverse member 186 may be omitted.

Figure 16:
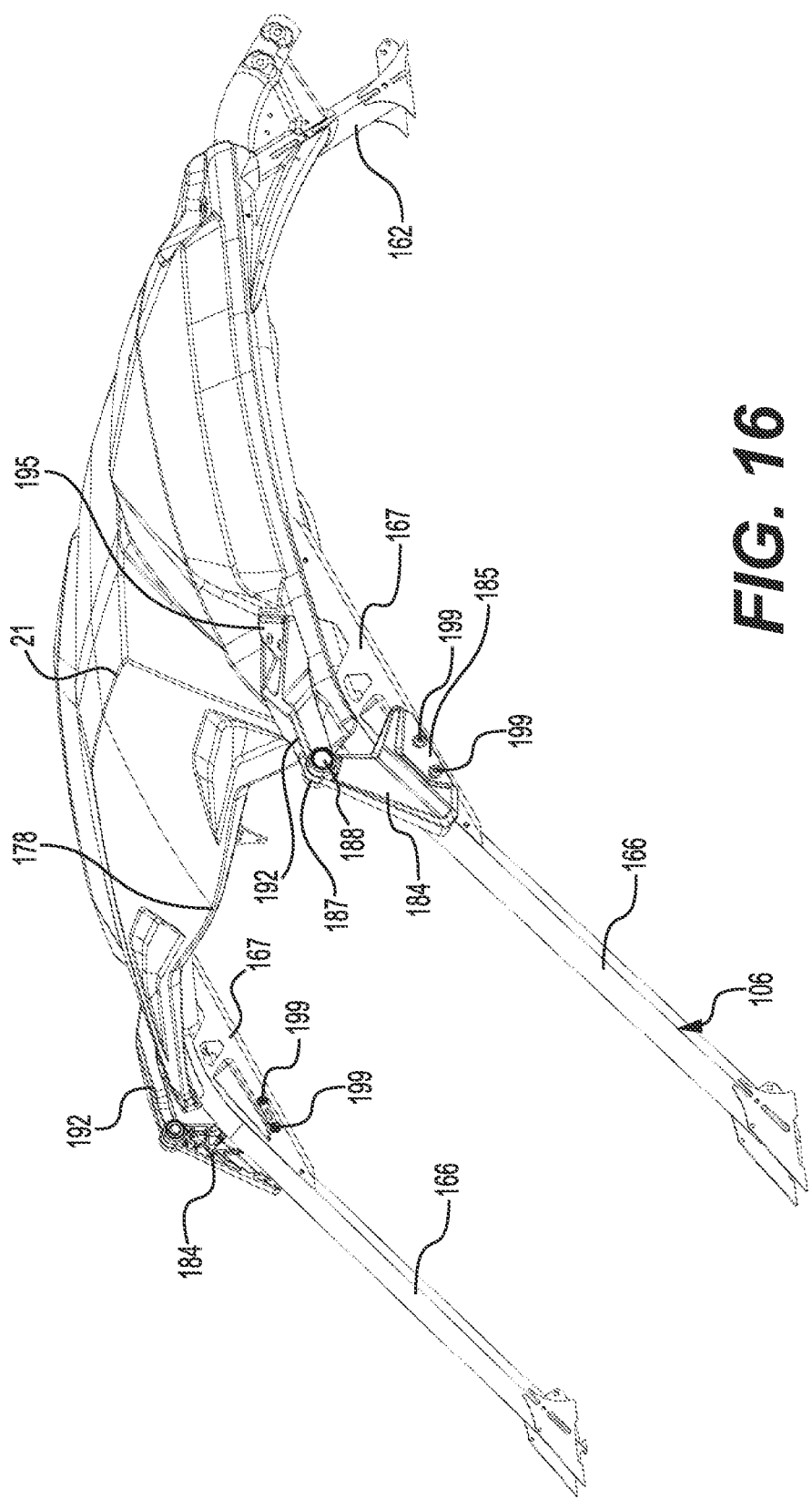
FIG. 16 is a perspective view, taken from a top, front, left side, of the roll cage, the roof and the pivotable connection therebetween according to an alternative embodiment.
Figure 17:
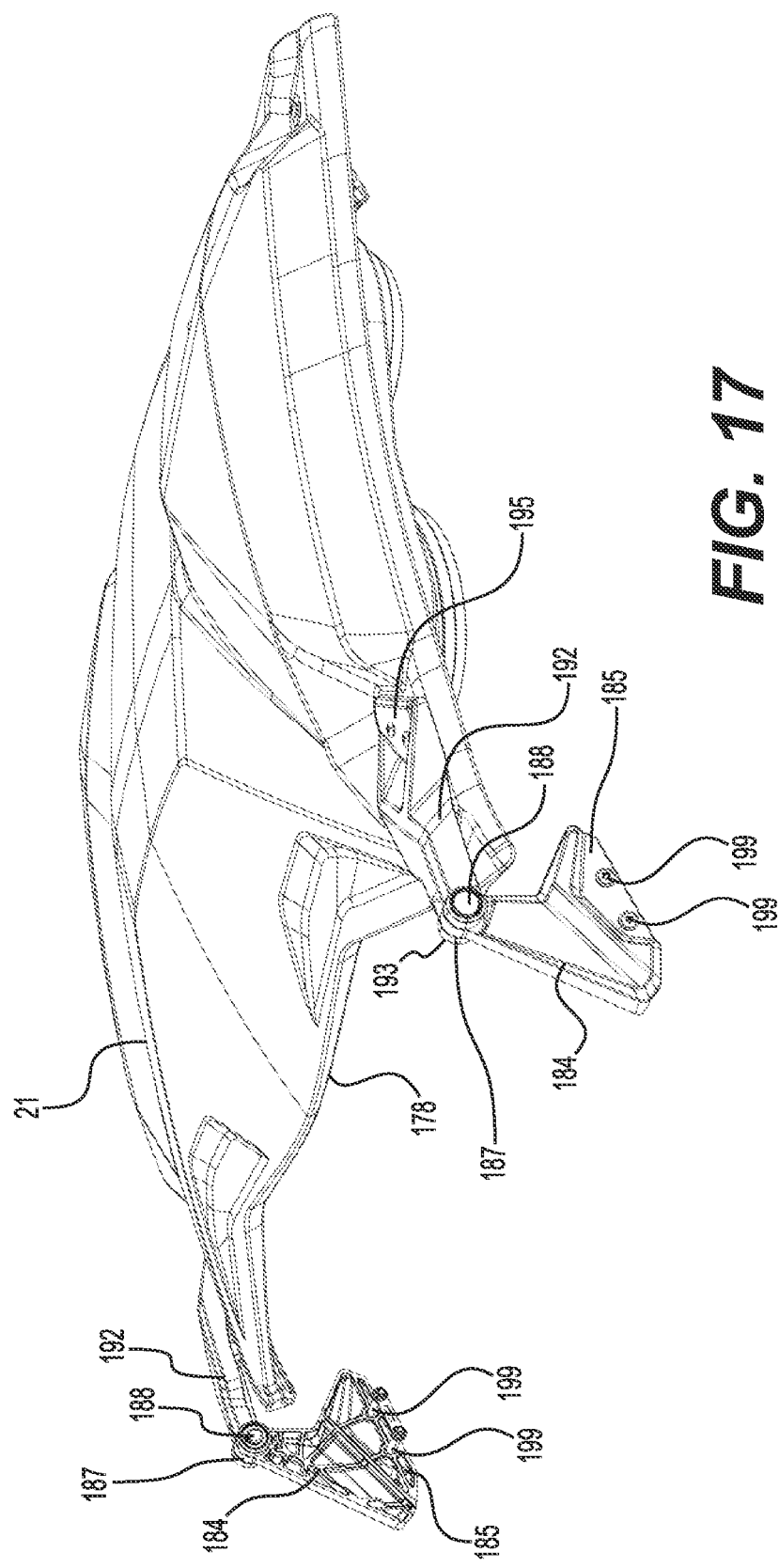
FIG. 17 is a perspective view, taken from a top, front, left side, of the roof and the pivotable connection of FIG. 16.
Figure 18:
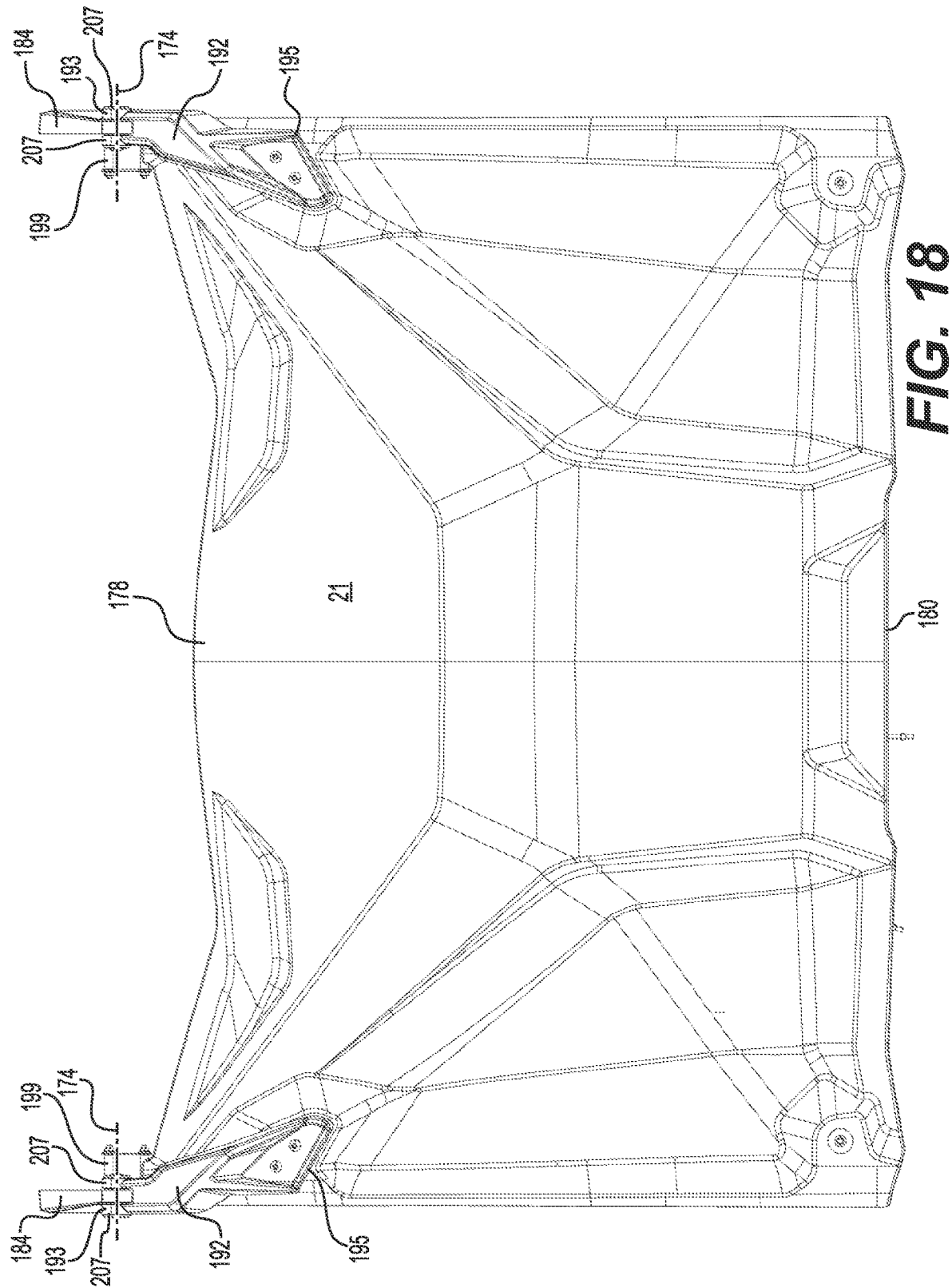
FIG. 18 is a top plan view of the roof and the pivotable connection of FIG. 16.

Furthermore, with reference to FIGS. 16 to 18, in an alternative embodiment, the pivoting connection between the roof 21 and the roll cage 106 includes the left and right upwardly extending members 184 and the left and right roof connecting arms 192 and omits the transverse member 186. Notably, as shown in FIGS. 16 and 17, in this alternative embodiment, the upwardly extending members 184 are not elongated but rather are generally arrow shaped. In particular, a longitudinal dimension of each upwardly extending member 184 increases from the upper end 187 towards the lower end 185. The lower end 185 of each upwardly extending member 184, which is connected to a corresponding bracket 167 by two fasteners 199, is therefore longer and may provide additional support to the pivoting connection between the roof 21 and the roll cage 106. As such, in this embodiment, the transverse member 186 is omitted. Furthermore, as best shown in FIG. 18, in this embodiment, the upper end 187 of each upwardly extending member 184 is disposed between two prongs 207 of the corresponding roof connecting arm 192.

Figure 13:
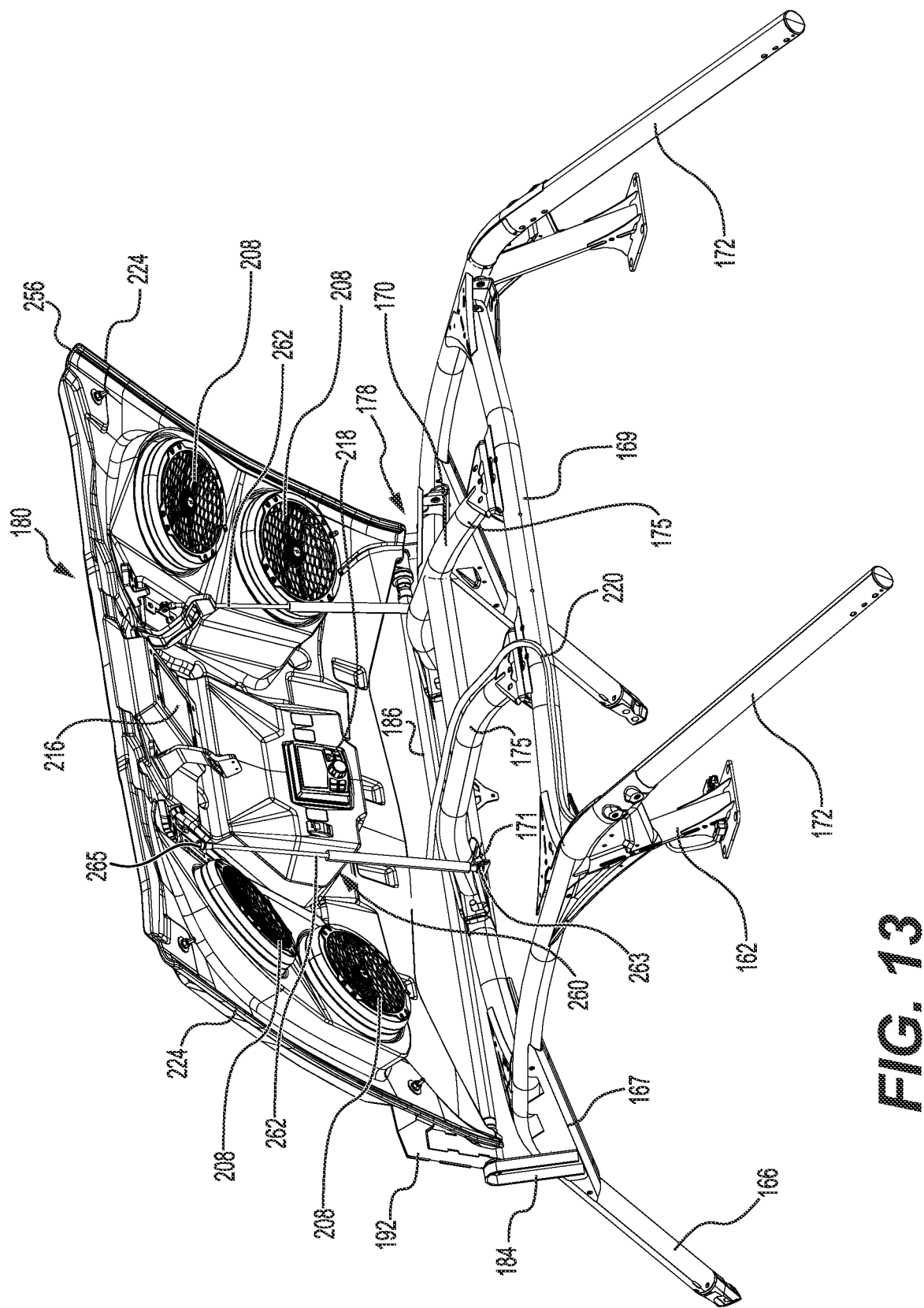
FIG. 13 is a perspective view, taken from a rear, left side, of the roof and the roll cage of the vehicle of FIG. 1 with the roof in the open position.

With reference now to FIG. 13, left and right roof support members 262 are provided to support the roof 21 in the open position. The roof support members 262 are connected between the roll cage 106 and the roof 21. Notably, each roof support member 262 has a first end 263 connected to a lower portion of a corresponding one of the brackets 171, and a second end 265 connected to the lower wall 200 of the roof 21. The second end 265 is connected to the roof 21 forwardly of a corresponding one of receivers 244, which will be described in more detail below. As shown in FIG. 12, in the closed position of the roof 21, the roof support members 262 are positioned laterally outwardly of the generally H-shaped frame structure. As shown in FIG. 13, in the open position of the roof 21, the roof support members 262 extend upwardly from the roll cage 106 to support the roof 21 in the open position.

Figure 8B:
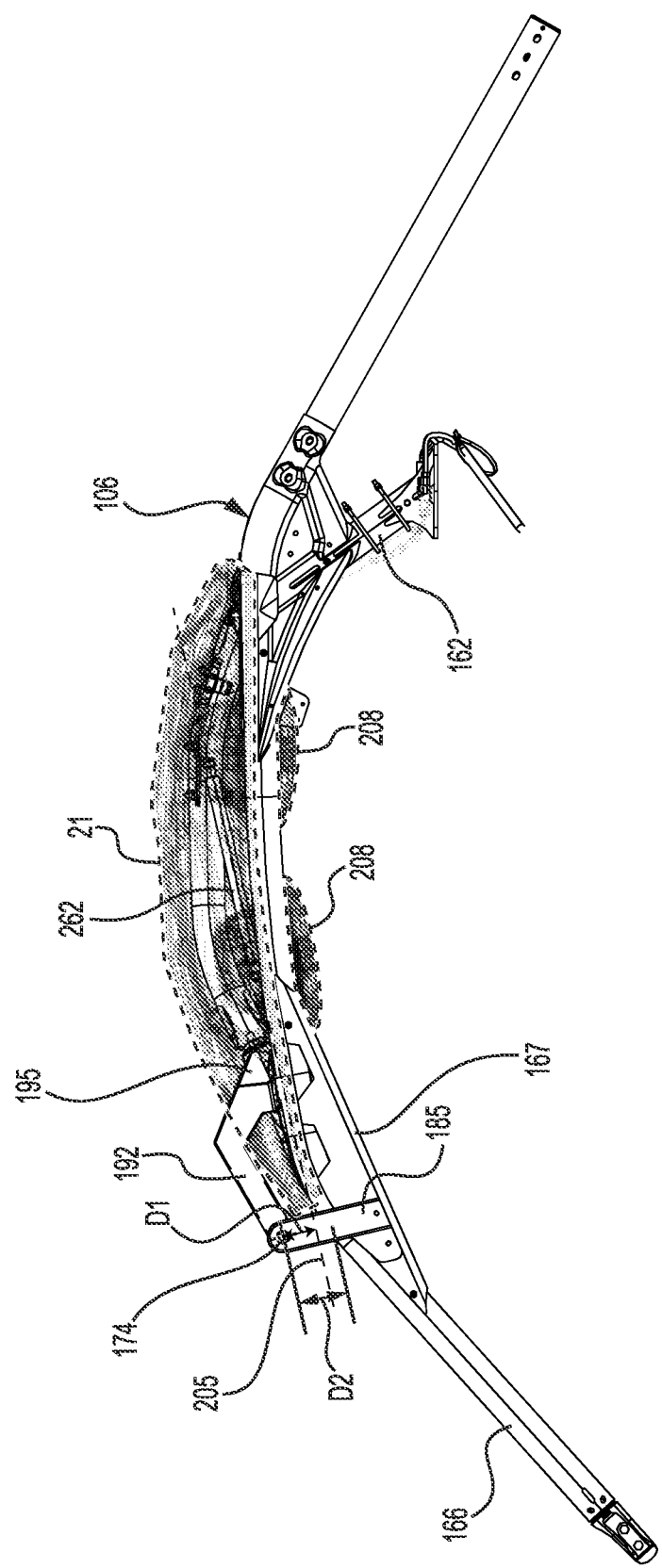
FIG. 8B is a left side elevation view of a roll cage of the frame and the roof of the vehicle of FIG. 1, with the roof in a closed position and shown in dashed lines to expose roof support members connected thereto.

Moreover, as shown in FIG. 8B, in the closed position of the roof 21, an axis 205 defined by each roof support member 262 extends vertically below and relatively close to the roof pivot axis 174. The axis 205 is the axis along which a respective roof support member 262 is elongated and generally extends and retracts during use. As can be seen, in the closed position of the roof 21, when viewed from a lateral side of the vehicle 10, a distance D1 measured perpendicularly from the axis 205 to the roof pivot axis 174 is smaller than a distance D2 measured parallel to the distance D1 between the roof pivot axis 174 and the legs 166 of the roll cage 106.

In this embodiment, the roof support members 262 are pneumatically supported so as to support the roof 21 in the open position. That is, each roof support member 262 includes a pneumatic component (i.e., a pneumatic cylinder) that uses air as a medium to support the load of the roof 21. As such, the roof support members 262 resist the lowering of the roof 21 from the open position to the closed position. It is contemplated that the roof support members 262 could alternatively be hydraulically supported. It is also contemplated that the roof support members 262 could be manually deployed by a user to selectively support the roof 21 in the open position.

Figure 10:
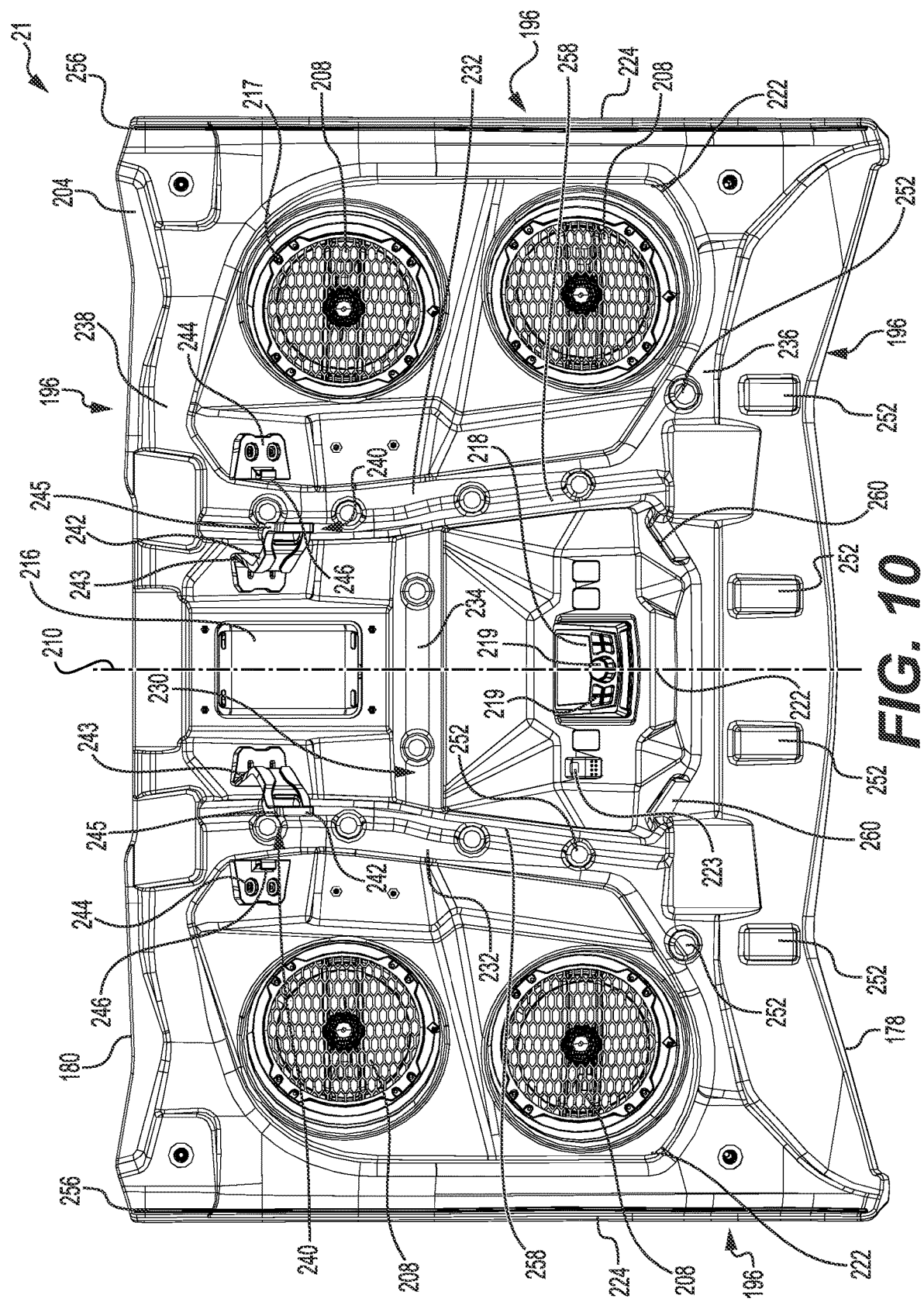
FIG. 10 is a bottom plan view of the roof of the vehicle of FIG. 1.
Figure 11:
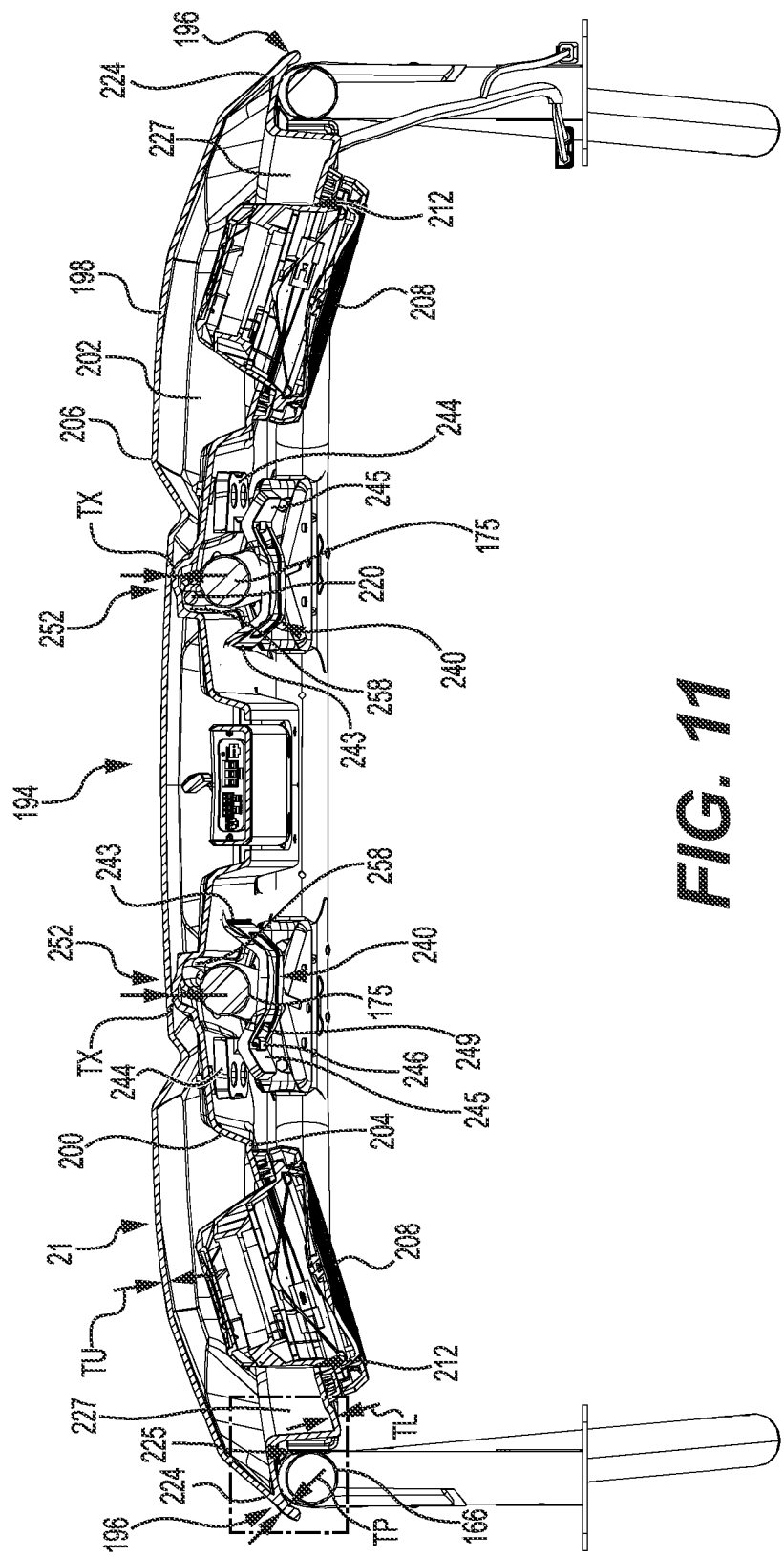
FIG. 11 is a cross-sectional view of the vehicle of FIG. 1 taken along line 11-11 in FIG. 2.

Turning now to FIGS. 10 to 12, the roof 21 will be described in greater detail. In this embodiment, the roof 21 is made of plastic material and is blow molded into shape such that the roof 21 is hollow. This allows a low production cost for the roof 21 while also making it relatively light. It is contemplated that, in other embodiments, the roof 21 could be made of other materials such as steel, aluminum, or carbon fibre composites.

As shown in FIG. 10, the roof 21 has a body portion 194 and a peripheral portion 196 surrounding the body portion 194. As can be seen in FIG. 11, the body and peripheral portions 194, 196 are formed by an upper wall 198 and a lower wall 200 of the roof 21 which define a hollow space 202 therebetween. A lower surface 204 of the roof 21 is defined by the lower wall 200, and an upper surface 206 of the roof 21 is defined by the upper wall 198.

As mentioned above, the roof 21 houses the audio system 150 including four speakers 208 thereof. The speakers 208 have a generally circular shape, and are positioned in pairs on either side of a longitudinal center line 210 of the roof 21 and are at least partially received in the roof 21 via speaker openings 212 (FIG. 10) defined in the lower surface 204 of the roof 21. The speaker openings 212 are circular and sized to allow the majority of the speakers 208 to be inserted therethrough and into the hollow space 202 of the roof 21. As such, the majority of a volume of the speakers 208 are disposed between the lower wall 200 and upper wall 198 of the roof 21. It is contemplated that the speaker openings 212 in the lower surface 204 of the roof 21 could have any shape and size that is complementary to any other size and shape of the speakers 208 in other embodiments such that they would allow the speakers 208 to be inserted therethrough and be disposed between the lower wall 200 and upper wall 198 of the roof 21.

Figure 14:
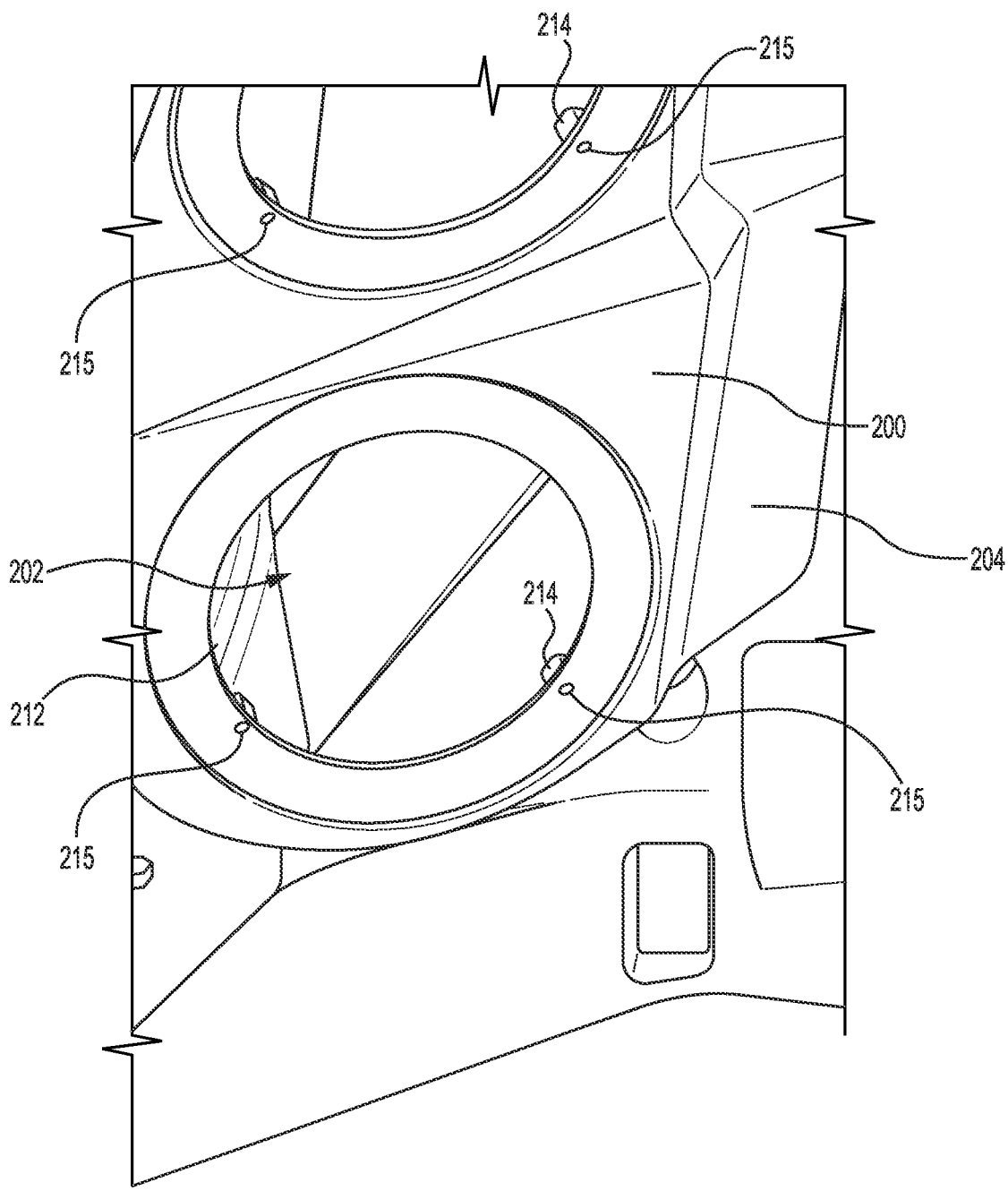
FIG. 14 is a bottom plan view of part of the roof of FIG. 10, with speakers of an audio system of the vehicle removed therefrom.
Figure 15:
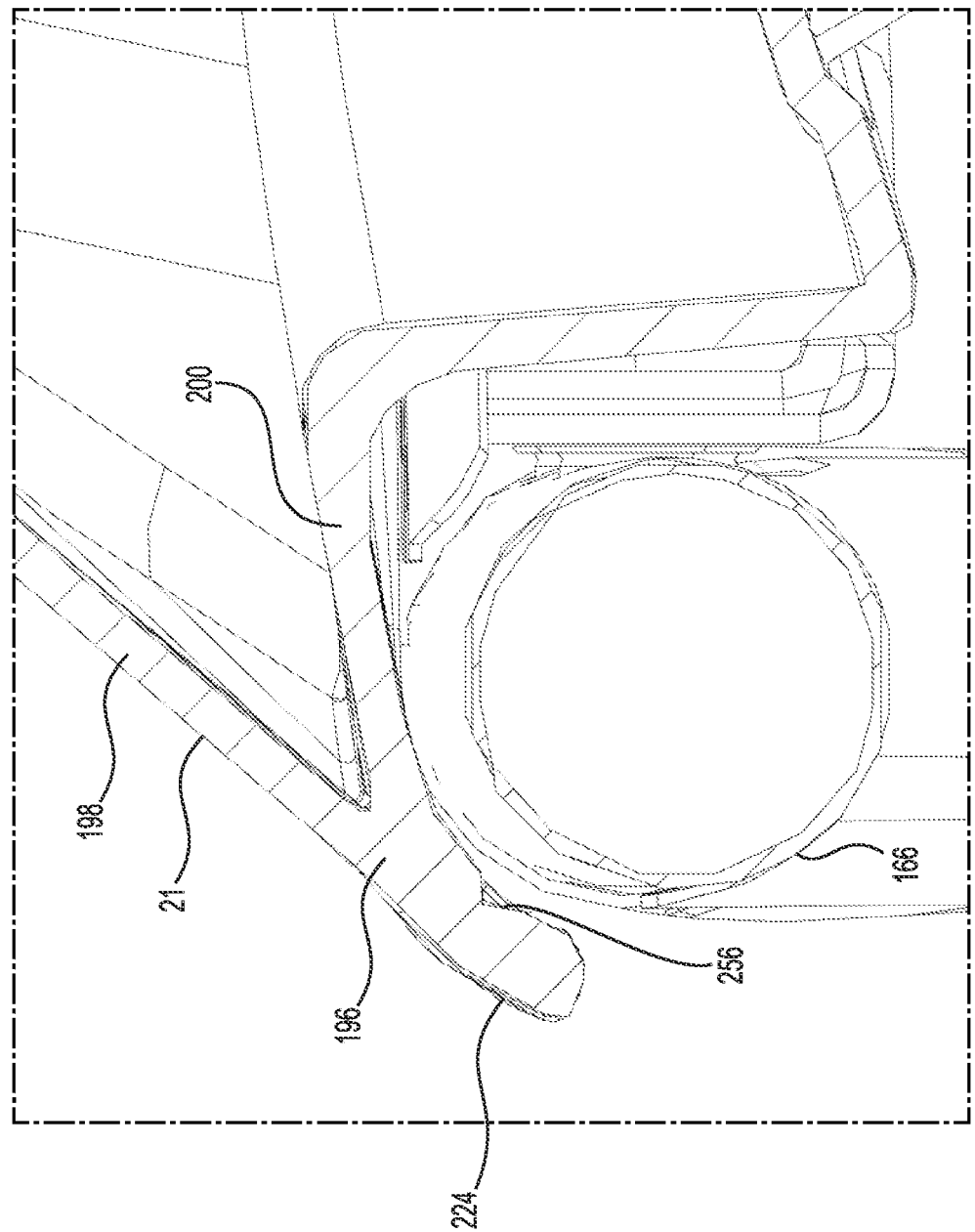
FIG. 15 is a close-up of a portion of the cross-sectional view of FIG. 11.

As shown in FIG. 14, the roof 21 has a plurality of inserts 214 that are molded integrally with the roof 21 on the lower wall 200 near the circumference of each speaker opening 212. The inserts 214 are configured for securing the speakers 208 to the lower wall 200 of the roof 21. Notably, each insert 214 defines a hole 215 in which a fastener 217 (FIG. 10) can be inserted to secure a respective speaker 208 to the lower wall 200 of the roof 21. It is contemplated that the number and position of the inserts 214 could be different in other embodiments.

As shown in FIG. 10, the audio system 150 also includes an amplifier 216 that is connected to the lower wall 200 of the roof 21 near the rear end 180 thereof and is generally centered with respect to the longitudinal center line 210 of the roof 21. Moreover, a control panel 218 of the audio system 150 configured for receiving operational inputs from the user is positioned closer to the front end 178 of the roof 21 than to the rear end 180 and is generally centered with respect to the longitudinal center line 210. The control panel 218 can receive various operational inputs from the user and has different operational controls 219 which are operated by the user for the desired operational input. For example, the operational controls 219 include a volume wheel to increase or decrease volume of the audio system 150, and a tuner wheel to select a radio station and/or select particular tracks of an audio playback device. The control panel 218 is also configured to control powering on/off of the audio system 150. In particular, as shown in FIG. 10, the control panel 218 has a power switch 223, located laterally next to the operational controls 219, which is operated by a user to selectively power the audio system 150. This allows the audio system 150 to be turned on even if the vehicle 10 is powered off (i.e., the motor 30 is not running) The amplifier 216 and the control panel 218 are each positioned laterally between two of the speakers 208 disposed on opposite sides of the longitudinal center line 210. The control panel 218 is in communication with the amplifier 216 and the speakers 208 via wires passing through the hollow space 202 of the roof 21.

The arrangement of the control panel 218 on the lower wall 200 of the roof 21 allows for the control panel 218 to be accessible to a driver sitting in the driver seat 24 in both the closed and open positions of the roof 21. Moreover, the arrangement of the speakers 208 on the lower wall 200 of the roof 21 allows the speakers 208 to face partly rearwardly in the open position of the roof 21. Notably, as can be seen in FIG. 13, in the open position of the roof 21, the speakers 208 are angled to project sound rearwardly more than in the closed position of the roof 21.

A battery (not shown) is disposed under the driver seat 24 and is connected to the amplifier 216, the speakers 208 and the control panel 218 via a wire 220 (FIG. 13) extending upward towards the roof 21 so as to provide power thereto. The battery is recharged by a generator coupled to the motor 30. In particular, with reference to FIG. 13, the wire 220 is attached to the frame 12 so as to extend upwardly along the left leg 162 of the roll cage 106, laterally along part of the rear cross-member 169, forwardly along the left longitudinally-extending member 175, and then entering the roof 21 near the front end 178 thereof, as will be discussed in greater detail below.

As shown in FIG. 10, the lower surface 204 of the roof 21 defines three apertures 222 for draining water from within the hollow space 202 of the roof 21. A central one of the apertures 222 is centered about the longitudinal center line 210 of the roof 21 and positioned forwardly of the control panel 218. The two other apertures 222, which may be referred to as lateral apertures, are laterally spaced apart from one another and positioned on either side of the longitudinal central line 210. Notably, each of the two lateral apertures 222 is positioned laterally outwardly of a front portion of the two frontmost speakers 208 near the front end 178 of the roof 21. This configuration allows for water or humidity accumulated inside the hollow space 202 of the roof 21 to drain out. In particular, the apertures 222 are located generally at a lowest part of the roof 21 (i.e., the front portion of the roof 21) to facilitate draining and, since the lower wall 200 of the roof 21 is not flat, various apertures 222 are provided at different locations to ensure water is not trapped in any portion of the roof 21.

As the roof 21 rests against the roll cage 106 when it is in the closed position, the roof 21 is configured so as to accommodate part of the roll cage 106 within its structure. For instance, in this embodiment, as can be seen in FIG. 11, left and right lateral end portions 224 of the peripheral portion 196 of the roof 21 are curved downwardly to define in part respective concave spaces 225 that receive the upper portions of the legs 166. The concave spaces 225 are also defined in part by an upwardly-extending shoulder portion 227 of the lower wall 200. The concave spaces 225 are thus defined by the lower wall 200.

Furthermore, the lower wall 200 of the roof 21 also extends upwardly toward the upper wall 198 at other sections thereof to define a plurality of depressions. For instance, as shown in FIG. 10, an H-shaped depression 230 is defined by the lower wall 200 at a central portion of the roof 21. The H-shaped depression 230 includes left and right generally longitudinally-extending depressions 232, each one being disposed on an opposite side of the longitudinal center line 210 of the roof 21, and a laterally-extending depression 234 connecting the two generally longitudinally-extending depressions 232. The H-shaped depression 230 is sized and shaped to receive an upper portion of the generally H-shaped frame structure 170 and the brackets 171 of the roll cage 106 when the roof 21 is in the closed position (see FIGS. 11, 12).

As shown in FIG. 10, front and rear laterally-extending depressions 236, 238 are formed by the lower wall 200 and are disposed near the front end 178 and the rear end 180 of the roof 21 respectively. The laterally extending depressions 236, 238 are sized and shaped to receive upper portions of the cross-members 168, 169 when the roof 21 is in the closed position (see FIG. 12).

The H-shaped depression 230 and the front and rear laterally-extending depressions 236, 238 are connected to one another. Together, the depressions 230, 236, 238 receive part of the roll cage 106 therein when the roof 21 is in the closed position and thus partly contribute in keeping the roof 21 in place when the roof 21 is in the closed position.

With reference to FIGS. 10 and 11, the lower wall 200 of the roof 21 also defines left and right wire recesses 258 extending along respective ones of the longitudinally-extending depressions 232 of the H-shape depression 230. More specifically, each wire recess 258 extends generally along a laterally inward side of the corresponding longitudinally-extending depression 232. In this embodiment, the left wire recess 258 receives the wire 220 therein in the closed position of the roof 21. Notably, in the closed position of the roof 21, the wire 220 attached to the H-shaped frame structure 170, namely to the left longitudinally-extending member 175, is received in the left wire recess 258 and enclosed therein. In other embodiments, the right wire recess 258 could receive the wire 220 therein in the closed position of the roof 21. In yet other embodiments, an additional wire of the audio system 150 may be provided such that both wire recesses 258 receive a respective one of the wires.

As mentioned above, the wire 220 is attached to the H-shaped frame structure 170 and connects to the roof 21 near the front end 178 thereof. Two apertures 260 are disposed on the lower wall 200 of the roof 21 in front of and laterally on each side of the control panel 218 to allow the wire 220 to extend therethrough and enter the hollow space 202 of the roof 21 to connect to the control panel 218. The wire 220 is provided with some slack at the entry of the corresponding aperture 260 to allow for displacement of the wire 220 as the roof 21 pivots from the closed to the open position and vice-versa.

With reference to FIGS. 10 to 12, left and right attachments 240 are connected to the lower wall 200 of the roof 21 for securing the roof 21 to the roll cage 106 in the closed position of the roof 21. In this embodiment, both attachments 240 are mirror images of one another about the longitudinal center line 210 of the roof 21 and therefore only the left attachment 240 will be described in detail herein. It is understood that the same description applies to the right attachment 240.

The attachment 240 includes a flexible strap 242 and a receiver 244 having a hook 246. A first end 243 of the flexible strap 242 is fixedly connected to the lower wall 200 of the roof 21 between the amplifier 216 and the left longitudinally-extending depression 232 of the H-shaped depression 230. The receiver 244 is fixedly connected to the lower wall 200 of the roof 21 across the left longitudinally-extending depression 232 from the first end 243 of the flexible strap 242 and directly opposite therefrom. The receiver 244 is configured to receive a second end 245 of the strap 242 so as to hold the strap 242 securely in place in the closed position of the roof 21. When the attachment 240 is not actively securing the roof 21 to the roll cage 106, as shown in FIG. 9A for example, the second end 245 of the flexible strap 242 is disconnected from the receiver 244.

As shown in FIG. 11, when the attachment 240 secures the roof 21 to the roll cage 106 in the closed position of the roof 21, a portion of the flexible strap 242 between the first and second ends 243, 245 extends underneath the left longitudinally-extending member 175 while the second end 245 of the flexible strap 242 is removably connected to the hook 246 of the receiver 244 on the opposite side of the left longitudinally-extending member 175. Notably, in this embodiment, an aperture 249 (FIG. 11) defined between the first and second ends 243, 245 of the flexible strap 242 is engaged by the hook 246 at the second end 245 of the flexible strap 242. A tip of the hook 246 is pointed generally laterally outwardly so as to prevent the strap 242 from disengaging the hook 246 accidentally. It is contemplated that other types of attachments, such as clips and other hook type fasteners, could be used to secure the roof 21 to the roll cage 106 in the closed position of the roof 21. It is also contemplated that any number of attachments 240 could be used and be disposed at various locations on the lower wall 200 of the roof 21 to secure the roof 21 to the roll cage 106 in the closed position of the roof 21.

As the roof 21 is a blow molded plastic component and is thus considerably light, the roof 21 is also configured so as to provide sufficient rigidity to support the audio system 150 adequately. Notably, in this embodiment, the peripheral portion 196 of the roof 21 is reinforced to be more rigid than non-reinforced sections of the roof 21. In particular, as seen in FIG. 11, the upper wall 198 and the lower wall 200 of the roof 21 are joined at the peripheral portion 196 such that a thickness TP of the peripheral portion 246 is greater than a thickness TU, TL of either one of the walls 198, 200 individually. More specifically, in this embodiment, the thickness TP of the peripheral portion 246 is approximately double the thickness TU of the upper wall 198 and the thickness TL of the lower wall 200 individually. This greater thickness of material at the peripheral portion 246 provides more rigidity at the peripheral portion 246 of the roof 21.

Furthermore, as shown in FIGS. 10 and 11, the body portion 194 of the roof 21 includes a plurality of pinched sections 252 whereby the upper wall 198 and the lower wall 200 of the roof 21 are joined together so as to provide a greater thickness of material at the pinched sections 252. Notably, a thickness TX (FIG. 11) of each of the pinched sections 252 is greater than the thickness TU, TL of either one of the upper wall 198 and the lower wall 200 individually. In particular, in this embodiment, the thickness TX of each of the pinched sections 252 is approximately double the thickness TU of the upper wall 248 and the thickness TL of the lower wall 250 individually.

As can be seen in FIG. 10, in this embodiment, ten pinched sections 252 are located in the H-shaped depression 230 in the lower wall 200 of the roof 21, four of which are spaced longitudinally from one another in each of the two generally longitudinally-extending depressions 232. Two pinched sections 252 are laterally spaced apart from one another in the laterally-extending depression 234 of the H-shaped depression 230. Two additional pinched sections 252 are located in the front laterally-extending depression 236, each of the two pinched sections 252 being laterally spaced from one another and disposed on either side of the longitudinal center line 210 of the roof 21. As can be seen, the pinched sections 252 in the H-shaped depression 230 are generally circular.

Furthermore, with continued reference to FIG. 10, four front pinched sections 252 are provided near the front end 178 of the roof 21. Notably, these front pinched sections 252 near the front end 178 are laterally spaced from one another and are generally rectangular. The front pinched sections 252 reinforce the front portion of the roof 21 so that one or more accessories can be attached thereto. For instance, a light bar for providing additional illumination may be connected to the roof 21 at the front portion thereof, in proximity of the front pinched sections 252.

The reinforcement of the roof 21 at the peripheral portions 196 and at the pinched sections 252 provides increased structural rigidity at these portions of the roof 21 so as to properly support the weight of the components of the audio system 150. Moreover, as the roof 21 is hollow and light, if not properly reinforced, it can be subject to vibrations in the upper and lower walls 198, 200 caused by the audio system 150 which will negatively affect the quality of the sound emitted thereby. Therefore, the reinforcement of the roof 21 improves the acoustic characteristics of the roof 21 as it can reduce vibrations caused by the audio system 150.

It will be noted that the pinched sections 252 provide greater rigidity to the roof 21 by being molded in this manner (such that the upper and lower walls 198, 200 are integrally joined to one another at the pinched sections 252) than if, instead of molding the roof 21 in this manner, fasteners were to engage the upper and lower walls 198, 200 at these areas.

Furthermore, as will be understood, the pinched sections 252 are formed by the lower wall 200 extending upwardly towards the upper wall 198 rather than the inverse (i.e., the upper wall 198 extending downwardly towards the lower wall 200). Notably, this can provide a more pleasing aesthetic look to the upper surface 206 of the roof 21 which is more exposed from the outside than the lower surface 204. In particular, this results in the upper surface 206 not defining recesses therein which may be visually less appealing, and moreover may be useful to avoid accumulation of water in such recesses as the upper surface 206, as opposed to the lower surface 204, is exposed to precipitation during use when the roof 21 is in the closed position.

It is contemplated that the pinched sections 252 could also be defined near areas where the roof connecting arms 192 are to be connected to the roof 21, in order to improve the structural integrity of the roof 21 at the connection sites.

In some embodiments, the doors 54 of the vehicle 10 may be full sized doors extending to the top of the passages 52 defined by the frame 12 and body panels of the vehicle 10. In such cases, the lateral end portions 224 of the roof 21 could potentially interfere with the doors 54 and prevent the doors 54 from properly closing and forming a seal between the legs 166 of the roll cage 106 and the doors 54. Therefore, in this embodiment, as best seen in FIGS. 10, 11,13 and 15, each lateral end portion 224 of the roof 21 defines a groove 256 defined by the lower wall 200 of the roof 21 and extending generally longitudinally from the front end 178 to the rear end 180 of the roof 21. The grooves 256 are configured to be cut along thereof for removing part of the lateral end portions 224 which could interfere with the closing of the doors 54 and the formation of a proper seal at the doors 54. Thus, a user wishing to install a full sized door on the vehicle 10 can cut along the grooves 256 to remove the part of the lateral end portions 224 which might otherwise interfere with the doors' proper sealing with the roll cage 106. As the groove 256 guides the cut, the user can produce a straight cut along the groove 256, thus leaving a straight edge that is aesthetically pleasing, which might otherwise be difficult for the user to perform if no groove were provided.

Figure 19:
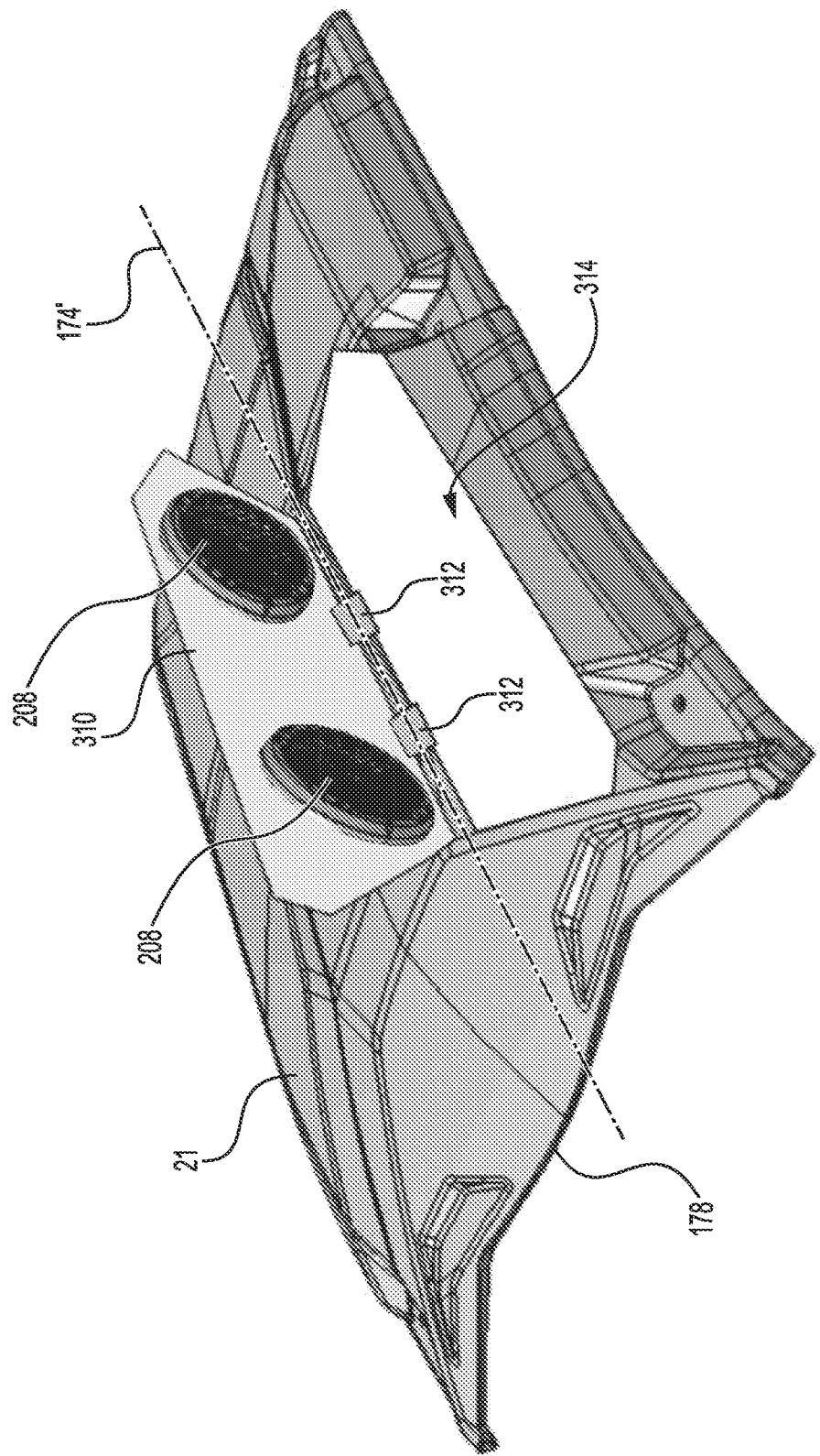
FIG. 19 is a perspective view, taken from a top, front, left side, of the roof in accordance with an alternative embodiment.

As mentioned briefly above, in some embodiments, only a portion of the roof 21 may be pivotable between the open and closed positions. This may place less strain on a pivot thereof as not the entire weight of the roof 21 would have to be pivoted about the pivot. Notably, in an alternative embodiment, as shown in FIG. 19, a portion 310 of the roof 21 is pivotable between the open and closed positions, while a remainder of the roof 21 stays in place, overlying the cockpit area 22. Notably, in this alternative embodiment, the portion 310 of the roof 21 is pivotable about two hinges 312 which pivotably connect the portion 310 to a remainder of the roof 21. The hinges 312 define a pivot axis 174' about which the portion 310 is pivotable between the open and closed positions. In this alternative embodiment, the pivot axis 174' extends generally longitudinally. As can be seen, two speakers 208 are connected to the underside of the portion 310 of the roof 21. Therefore, when the portion 310 is in the open position, as illustrated in FIG. 19, the two speakers 208 mounted to the portion 310 face in part towards a lateral side of the vehicle 10 (e.g., the left side in this example). When the portion 310 is in the open position, the roof 21 defines an opening 314 corresponding to the closed position of the portion 310. As such, in the open position of the portion 310, the portion 310 exposes in part the roof opening 176 defined by the roll cage 106. In some embodiments, one or more additional portions of the roof 21 may be pivotable between respective open and closed positions (with speakers 208 also mounted to those portions).

Figure 20:
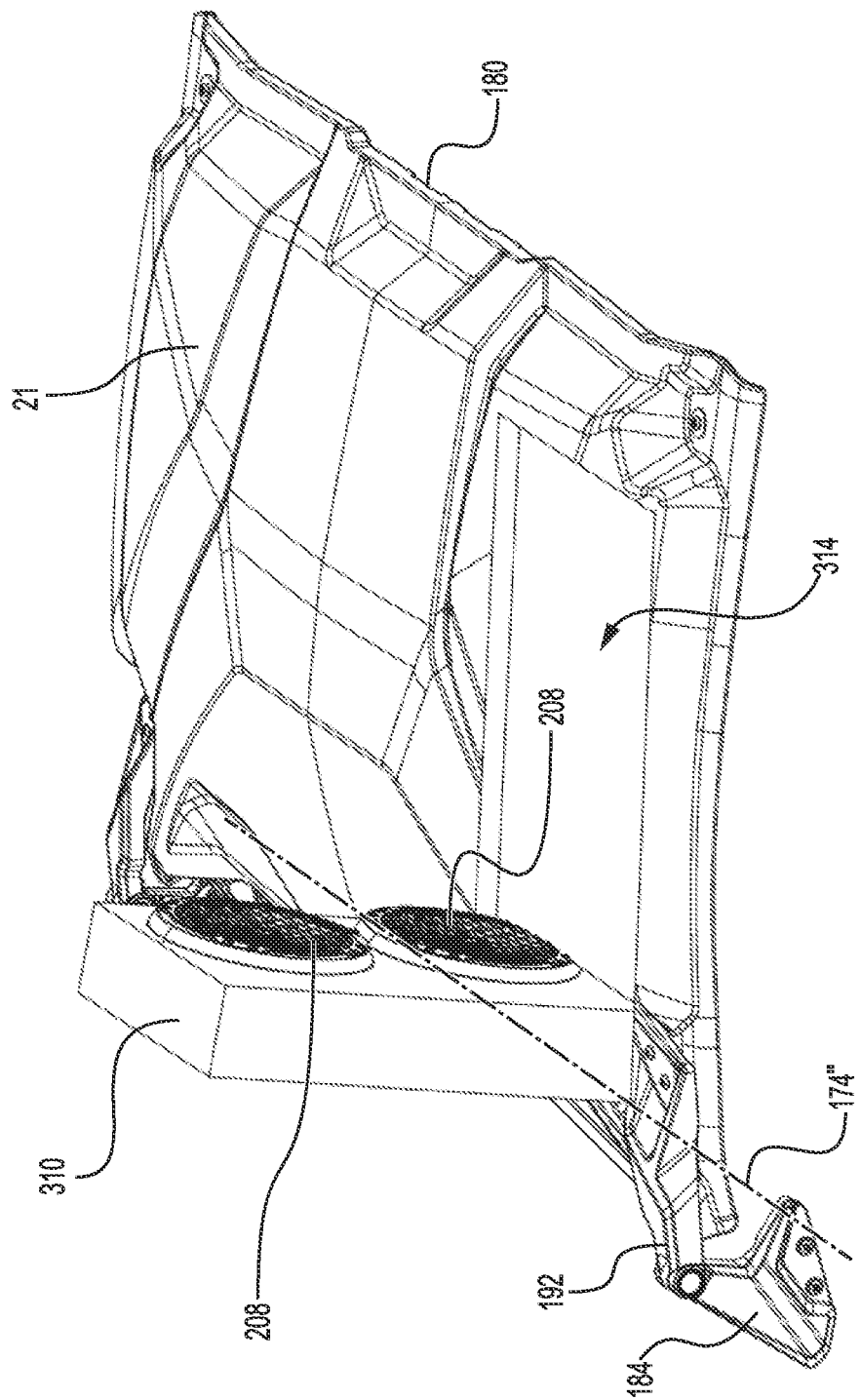
FIG. 20 is a perspective view, taken from a top, rear, left side, of the roof in accordance with another alternative embodiment.
Figure 21:
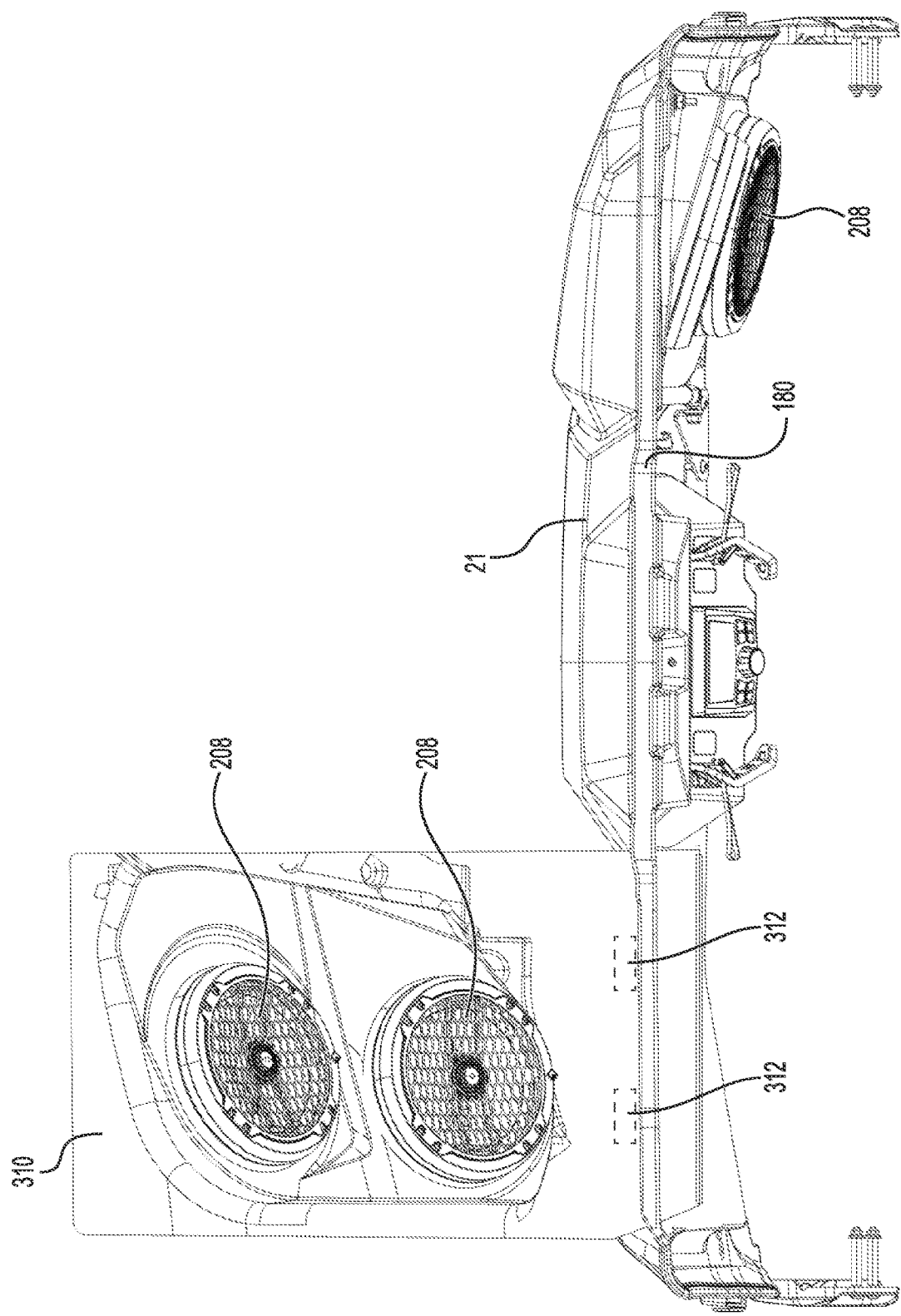
FIG. 21 is a rear elevation view of the roof of FIG. 20.

Furthermore, with reference to FIGS. 20 and 21, in another alternative embodiment, the portion 310 of the roof 21 is pivotable about a pivot axis 174" extending laterally. In this alternative embodiment, the pivot axis 174" is positioned rearwardly of the front end 178 of the roof 21. As illustrated, in this alternative embodiment, in the open position of the portion 310 of the roof 21, the two speakers 208 mounted to the portion 310 face partly rearwardly.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle, comprising:
   a frame including a roll cage, the roll cage having a front end and a rear end disposed forwardly and rearwardly of a cockpit area of the vehicle respectively such that a portion of the roll cage extends above the cockpit area;
   a motor connected to the frame;

a driver seat connected to the frame and disposed in the cockpit area, the roll cage at least partly surrounding the driver seat;

at least one front suspension assembly connected to the frame;

at least one rear suspension assembly connected to the frame;

at least one front ground-engaging member operatively connected to the at least one front suspension assembly;

at least one rear ground-engaging member operatively connected to the at least one rear suspension assembly, at least one of the at least one front ground-engaging member and the at least one rear ground-engaging member being operatively connected to the motor;

a steering system for steering one or both of the at least one front ground-engaging member and the at least one rear ground-engaging member;

a roof extending at least in part above the driver seat and having an upper surface and a lower surface, at least part of the roof being pivotably connected to the roll cage about a roof pivot axis so that the at least part of the roof is pivotable relative to the roll cage from a closed position to an open position, in the closed position, the at least part of the roof covering a roof opening defined by the portion of the roll cage extending above the cockpit area, the roof pivot axis being disposed forwardly of the roof in the closed position of the at least part of the roof, and in the open position, the at least part of the roof at least partly exposing the roof opening defined by the portion of the roll cage extending above the cockpit area; and an audio system including at least one speaker connected to the roof and, in the open position, the at least one speaker is configured to project sound at least partly toward an exterior of the vehicle, in the open position, the at least one speaker being configured to project sound more rearwardly than in the closed position.

2. The vehicle of claim 1, wherein:
the roof pivot axis extends laterally; and
the roof pivot axis is disposed vertically higher than a front end of the roof when the vehicle is on a flat horizontal surface and the at least part of the roof is in the closed position.

3. The vehicle of claim 1, further comprising:
at least one upwardly-extending member connected to the roll cage; and
at least one roof connecting arm connected between the roof and the upwardly-extending member, the at least one roof connecting arm being pivotably connected to the at least one upwardly-extending member about the roof pivot axis,
wherein:
the at least one upwardly-extending member has a lower end and an upper end;
the at least one roof connecting arm has a front end and a rear end;
the lower end of the at least one upwardly-extending member is connected to the roll cage;
the upper end of the at least one upwardly-extending member is pivotably connected to the front end of the at least one roof connecting arm, the roof pivot axis being defined at the upper end of the at least one upwardly-extending member; and
the rear end of the at least one roof connecting arm is connected to the roof.

4. The vehicle of claim 3, wherein:
the at least one upwardly-extending member comprises a first upwardly extending member and a second upwardly extending member, the first upwardly extending member and the second upwardly extending member being laterally-spaced from one another;
the at least one roof connecting arm comprises a first roof connecting arm and a second roof connecting arm, the first roof connecting arm and the second roof connecting arm being laterally-spaced from one another; and
the vehicle further comprises a transverse member interconnecting the first upwardly-extending member and the first roof connecting arm to the second upwardly-extending member and the second roof connecting arm, the transverse member extending along the roof pivot axis.

5. The vehicle of claim 1, wherein:
the roof is hollow;
the roof has a body portion and a peripheral portion surrounding the body portion;
the roof has an upper wall and a lower wall which form the body and peripheral portions, the upper wall defining the upper surface of the roof, the lower wall defining the lower surface of the roof; and
the upper and lower walls define at least one hollow space therebetween.

6. The vehicle of claim 5, wherein:
the peripheral portion comprises two lateral end portions, a front end portion, and a rear end portion; and
the lateral end portions are curved downwardly to define respective concave spaces that receive part of the frame therein in the closed position of the at least part of the roof.

7. The vehicle of claim 5, wherein:
the body portion defines at least one pinched section whereby the upper wall and the lower wall of the roof are joined together such that a thickness of the at least one pinched section is greater than a thickness of either of the upper wall and the lower wall individually.

8. The vehicle of claim 7, wherein:
the lower wall extends upwardly toward the upper wall near the at least one pinched section to define at least one depression;
the at least one depression extends generally longitudinally and is sized and shaped to receive at least part of the roll cage therein when the at least part of the roof is in the closed position; and
the at least one pinched section is located at a position of the least one depression of the lower wall.

9. The vehicle of claim 5, further comprising:
at least one upwardly-extending member connected to the roll cage; and
at least one roof connecting arm connected between the roof and the upwardly-extending member, the at least one roof connecting arm being pivotably connected to the at least one upwardly-extending member about the roof pivot axis, the at least one roof connecting arm being connected to the roof near the at least one pinched section.

10. The vehicle of claim 5, wherein the at least one speaker is connected to the lower wall of the roof.

11. The vehicle of claim 10, wherein the audio system further comprises a control panel in communication with the amplifier and the at least one speaker, the control panel being connected to the lower wall of the roof.

12. The vehicle of claim 10, wherein a majority of the at least one speaker is disposed between the lower and upper walls of the roof.

13. The vehicle of claim 10, wherein the at least part of the roof pivots forwardly from the closed position to the open position so that the at least one speaker at least partly faces rearwardly in the open position of the at least part of the roof.

14. The vehicle of claim 5, wherein each lateral end portion of the two lateral end portions defines a groove extending generally longitudinally and configured to be cut along thereof for removing part of the respective lateral end portion.

15. The vehicle of claim 5, wherein the lower surface of the roof comprises at least one aperture for draining water from within the at least one hollow space defined by the roof.

16. The vehicle of claim 1, wherein the roof further comprises at least one attachment for securing the roof to the roll cage in the closed position of the at least part of the roof, the at least one attachment being disposed on the lower surface of the roof.

17. The vehicle of claim 16, wherein each of the at least one attachment comprises a flexible clamp that wraps around a corresponding part of the roll cage to secure the roof to the roll cage in the closed position of the at least part of the roof.

18. The vehicle of claim 1, further comprising a roof support member for supporting the at least part of the roof in the open position, the roof support member being connected between the roll cage and the roof, wherein:
in the open position, the roof support member extends upwardly from the roll cage to support the at least part of the roof.

19. The vehicle of claim 18, wherein the roof support member is one of pneumatically and hydraulically supported.

20. The vehicle of claim 1, wherein the vehicle is a side-by-side vehicle (SSV).

21. The vehicle of claim 1,
wherein an entirety of the roof is pivotably connected to the roll cage about a roof pivot axis so that the entirety of the roof is pivotable relative to the roll cage from a closed position to an open position,
in the closed position, the entirety of the roof covering a roof opening defined by the portion of the roll cage extending above the cockpit area, and
in the open position, the entirety of the roof at least partly exposing the roof opening defined by the portion of the roll cage extending above the cockpit area.

22. A vehicle, comprising:
a frame including a roll cage, the roll cage having a front end and a rear end disposed forwardly and rearwardly of a cockpit area of the vehicle respectively such that a portion of the roll cage extends above the cockpit area;
a motor connected to the frame;
a driver seat connected to the frame and disposed in the cockpit area, the roll cage at least partly surrounding the driver seat;
at least one front suspension assembly connected to the frame;
at least one rear suspension assembly connected to the frame;
at least one front ground-engaging member operatively connected to the at least one front suspension assembly;
at least one rear ground-engaging member operatively connected to the at least one rear suspension assembly, at least one of the at least one front ground-engaging member and the at least one rear ground-engaging member being operatively connected to the motor;
a steering system for steering one or both of the at least one front ground-engaging member and the at least one rear ground-engaging member;
a roof extending at least in part above the driver seat and having an upper surface and a lower surface, at least part of the roof being pivotably connected to the roll cage about a roof pivot axis so that the at least part of the roof is pivotable relative to the roll cage from a closed position to an open position,
in the closed position, the at least part of the roof covering a roof opening defined by the portion of the roll cage extending above the cockpit area, and
in the open position, the at least part of the roof at least partly exposing the roof opening defined by the portion of the roll cage extending above the cockpit area; and
wherein
the roof is hollow,
the roof has a body portion and a peripheral portion surrounding the body portion;
the roof has an upper wall and a lower wall which form the body and peripheral portions, the upper wall defining the upper surface of the roof, the lower wall defining the lower surface of the roof;
the at least part of the roof comprises at least part of the upper wall and at least part of the lower wall such that the at least part of the upper wall and the at least part of the lower wall pivot about the roof pivot axis; and
the upper and lower walls define at least one hollow space therebetween.

23. A vehicle, comprising:
a frame including a roll cage, the roll cage having a front end and a rear end disposed forwardly and rearwardly of a cockpit area of the vehicle respectively such that a portion of the roll cage extends above the cockpit area;
a motor connected to the frame;
a driver seat connected to the frame and disposed in the cockpit area, the roll cage at least partly surrounding the driver seat;
at least one front suspension assembly connected to the frame;
at least one rear suspension assembly connected to the frame;
at least one front ground-engaging member operatively connected to the at least one front suspension assembly;
at least one rear ground-engaging member operatively connected to the at least one rear suspension assembly, at least one of the at least one front ground-engaging member and the at least one rear ground-engaging member being operatively connected to the motor;
a steering system for steering one or both of the at least one front ground-engaging member and the at least one rear ground-engaging member; and
a roof extending at least in part above the driver seat and having an upper surface and a lower surface, at least part of the roof being pivotably connected to the roll cage about a roof pivot axis so that the at least part of the roof is pivotable relative to the roll cage from a closed position to an open position,
in the closed position, the at least part of the roof covering a roof opening defined by the portion of the roll cage extending above the cockpit area, and
in the open position, the at least part of the roof at least partly exposing the roof opening defined by the portion of the roll cage extending above the cockpit area; and the roof having at least one attachment for securing the roof to the roll cage in the closed position of the at least part of the roof, the at least one attachment being disposed on the lower surface of the roof, and each of the at least one attachment having a flexible clamp that wraps around a corresponding part of the roll cage to secure the roof to the roll cage in the closed position of the at least part of the roof.

* * * * *